United States Patent [19]
Kanai et al.

[11] Patent Number: 5,778,179
[45] Date of Patent: Jul. 7, 1998

[54] SYSTEM FOR FLEXIBLE DISTRIBUTED PROCESSING AND TRANSACTION PROCESSING SUITABLE FOR NESTED TRANSACTION

[75] Inventors: Tatsunori Kanai; Toshio Shirakihara, both of Kanagawa-ken, Japan

[73] Assignee: Kabushiki Kaisha Toshiba, Kawasaki, Japan

[21] Appl. No.: 827,895

[22] Filed: Apr. 7, 1997

Related U.S. Application Data

[63] Continuation of Ser. No. 997,445, Dec. 28, 1992, abandoned.

[30] Foreign Application Priority Data

Dec. 26, 1991 [JP] Japan ............................ 3-344685

[51] Int. Cl.$^6$ .......................................... G06F 15/163
[52] U.S. Cl. .................. 395/200.33; 395/680; 395/675
[58] Field of Search ........................... 395/200.33, 680, 395/675

[56] References Cited

U.S. PATENT DOCUMENTS

| | | | |
|---|---|---|---|
| 4,410,940 | 10/1983 | Carlson et al. | 395/676 |
| 5,095,421 | 3/1992 | Freund | 395/671 |
| 5,261,089 | 11/1993 | Coleman et al. | 395/608 |
| 5,335,343 | 8/1994 | Lampson et al. | 395/182.17 |
| 5,465,328 | 11/1995 | Dievendorff et al. | 395/182.13 |
| 5,544,316 | 8/1996 | Carpenter et al. | 395/680 |

OTHER PUBLICATIONS

"Nested Transactions: An Approach to Reliable Distributed Computing", J. Eliot B. Moss, 1985, MIT Press, pp. 44–93.

*Primary Examiner*—Parshotam S. Lall
*Assistant Examiner*—Kenneth R. Coulter
*Attorney, Agent, or Firm*—Oblon, Spivak, McClelland, Maier & Neustadt, P.C.

[57] ABSTRACT

A flexible distributed processing system capable of dealing with sophisticated conditions for selecting a server process. In the system, each of the services provided by all server processes is registered in the service manager in correspondence with an executability condition for judging whether each service is executed, such that the service manager selects one of the server processes which is providing the desired service indicated by the inquiry transmitted from the client process and which is judged to be executable according to the executability condition registered at the service manager, and the client process requests the desired service the selected one of the server processes. The system can utilize a transaction processing for a nested transaction in which a commit processing for the processes of the sub-transactions which are incapable of executing the nested transaction, is completed concurrently with a completion of the commit processing for the top level transaction.

50 Claims, 34 Drawing Sheets

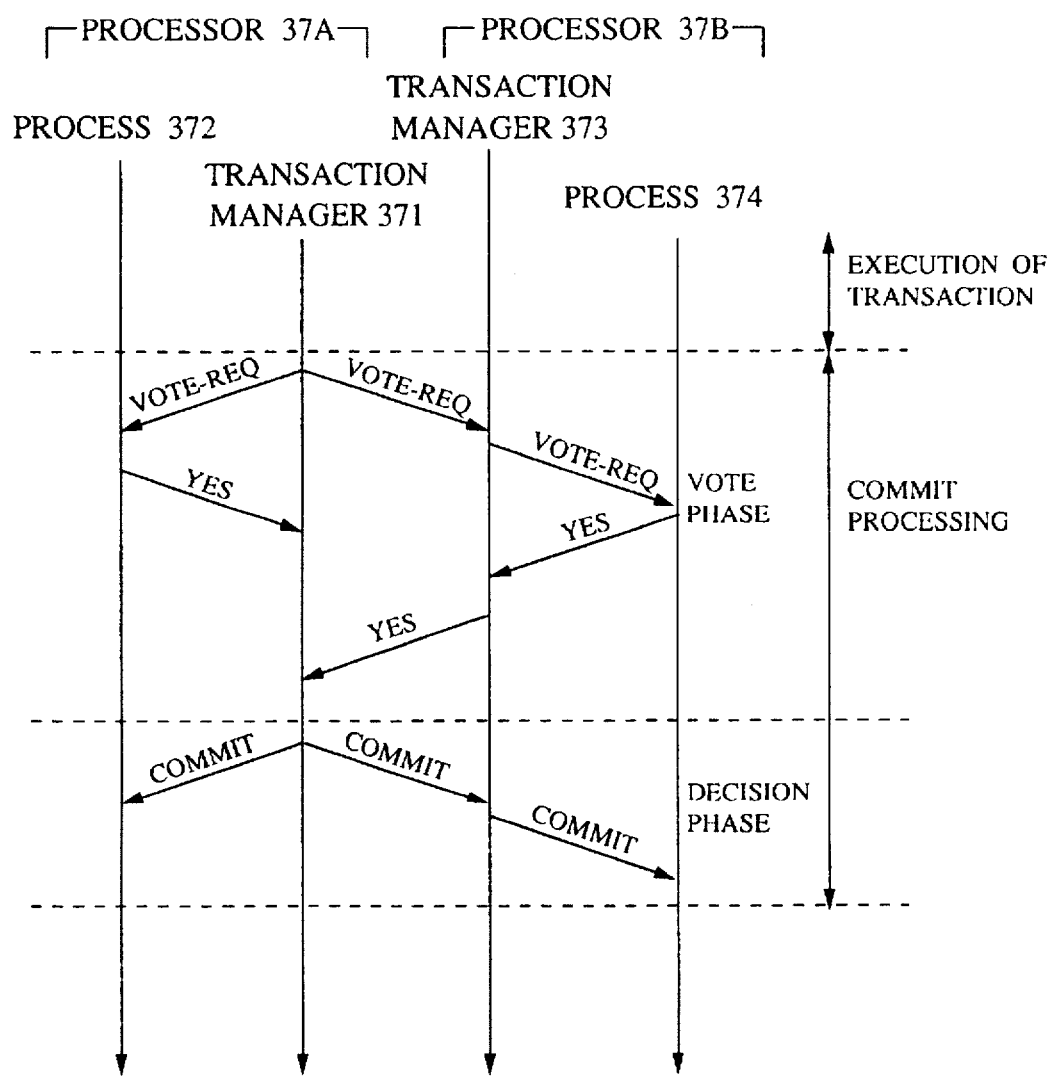

| | PROCESSOR NAME | SERVER NAME | SERVICE NAME | JUDGMENT PROCEDURE |
|---|---|---|---|---|
| 1 | A | Teller | Deposit | (1<=arg 1)&&(49999<=arg 1) |
| 2 | A | Teller | Withdraw | (1<=arg 1)&&(49999<=arg 1) |
| 3 | B | Teller | Deposit | (50000<=arg 1)&&(99999<=arg 1) |
| 4 | B | Teller | Withdraw | (50000<=arg 1)&&(99999<=arg 1) |

| | SERVICE MANAGER | PROCESSOR |
|---|---|---|
| 1 | SERVICE MANAGER-A | PROCESSOR-A |
| 2 | SERVICE MANAGER-B | PROCESSOR-B |

FIG.22

|   | PROCESSOR NAME | SERVER NAME | SERVICE NAME | JUDGMENT PROGRAM |
|---|---|---|---|---|
| 1 | A | Teller | Deposit | JUDGMENT PROGRAM -A |
| 2 | A | Teller | Withdraw | JUDGMENT PROGRAM -A |
| 3 | B | Teller | Deposit | JUDGMENT PROGRAM -B |
| 4 | B | Teller | Withdraw | JUDGMENT PROGRAM -B |

FIG.23

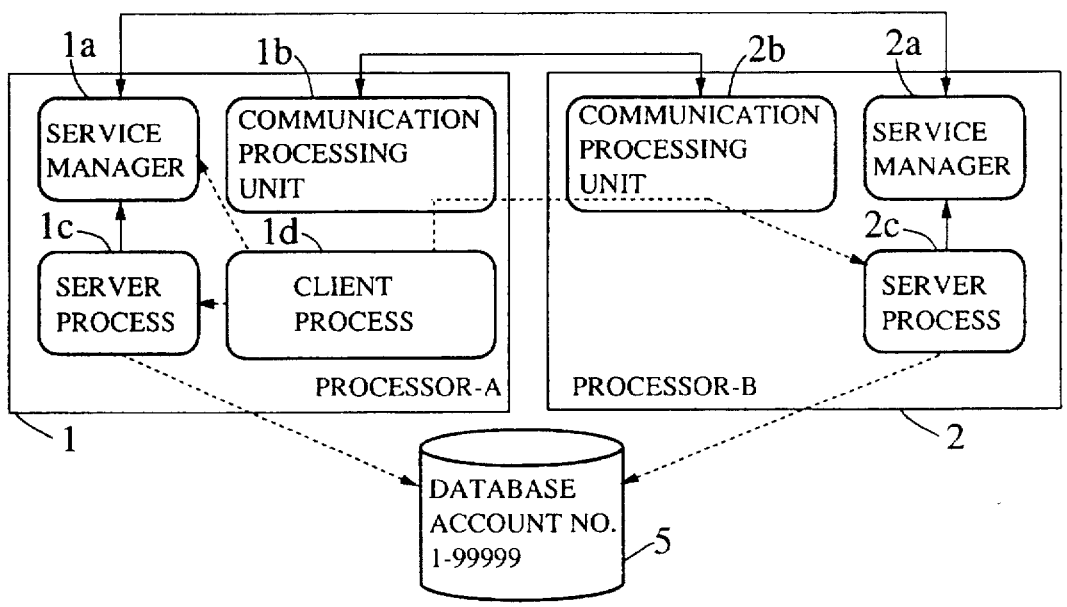

FIG.24

|   | PROCESSOR NAME | SERVER NAME | SERVICE NAME | JUDGMENT PROCEDURE |
|---|---|---|---|---|
| 1 | A | Teller | Deposit | (1<=arg 1)&&(99999<=arg 1) |
| 2 | A | Teller | Withdraw | (1<=arg 1)&&(99999<=arg 1) |
| 3 | B | Teller | Deposit | (1<=arg 1)&&(99999<=arg 1) |
| 4 | B | Teller | Withdraw | (1<=arg 1)&&(99999<=arg 1) |

| PROCESS TABLE 1211 | | TRANSACTION TABLE | | | | 121 1212 | |
|---|---|---|---|---|---|---|---|
| PROCESS NUMBER | HIERARCHY FLAG | TRANSACTION IDENTIFIER | PARENT TRANSACTION | STATE | PROCESS 1 | PROCESS 2 | ... |
| 1 | NESTED | T | - | EXECUTION | 1 | 0 | |
| 2 | NON-NESTED | S | T | COMMIT | 1 | 1 | |
| ⋮ | ⋮ | ⋮ | ⋮ | ⋮ | ⋮ | ⋮ | |
| n | | | | | | | |

/131

| PROCESS TABLE /1311 | | TRANSACTION TABLE | | | | | /1312 | |
|---|---|---|---|---|---|---|---|---|
| PROCESS NUMBER | HIERARCHY FLAG | TRANSACTION IDENTIFIER | PARENT TRANSACTION | STATE | PROCESS 1 | ... | NODE 2 | ... |
| 1 | NESTED | T | - | EXECUTION | 1 | ... | 0 | ... |
| ⋮ | | S | T | COMMIT | 1 | ... | 1 | ... |
| | | ⋮ | ⋮ | ⋮ | ⋮ | | ⋮ | |
| | | | | | | | | |

/141

| PROCESS TABLE /1411 | | TRANSACTION TABLE | | | | | /1412 | |
|---|---|---|---|---|---|---|---|---|
| PROCESS NUMBER | HIERARCHY FLAG | TRANSACTION IDENTIFIER | PARENT TRANSACTION | STATE | PROCESS 2 | ... | NODE 2 | ... |
| 2 | NON-NESTED | S | T | COMMIT | 1 | ... | 1 | ... |
| ⋮ | | | | | | | | |
| | | | | | | | | |
| | | | | | | | | |

251

PROCESS TABLE 2511  TRANSACTION TABLE 2512

| PROCESS NUMBER | HIERARCHY FLAG | TRANSACTION IDENTIFIER | PARENT TRANSACTION | STATE | PROCESS 1 | ... | NODE 2 | ... |
|---|---|---|---|---|---|---|---|---|
| 1 | NESTED | T | - | EXECUTION | 1 | ... | 0 | ... |
| ⋮ |  | S | T | COMMIT | 1 | ... | 1 | ... |

NODE TABLE

| NODE NUMBER | HIERARCHY FLAG |
|---|---|
| 2 | NON-NESTED |
| ⋮ |  |

2513

261

TRANSACTION TABLE 2612

| TRANSACTION IDENTIFIER | STATE | PROCESS 2 | ... | NODE 1 | ... |
|---|---|---|---|---|---|
| S | EXECUTION | 1 | ... | 1 | ... |
|  |  |  |  |  |  |
|  |  |  |  |  |  |

SYSTEM FOR FLEXIBLE DISTRIBUTED PROCESSING AND TRANSACTION PROCESSING SUITABLE FOR NESTED TRANSACTION

This application is a continuation of application Ser. No. 07/997,445, filed on Dec. 28, 1992, now abandoned.

BACKGROUND OF THE INVENTION

1. Field of the Invention

The present invention relates to a distributed processing system used in a computer system under a distributed processing environment, and a transaction processing system to be utilized in the distributed processing system.

2. Description of the Background Art

In a distributed processing environment, server processes to carry out various services are distributed over a plurality of processors.

Consequently, when it becomes necessary for a client process on one processor to receive a desired service provided by some server process, the client process transmits a service request to that server process which is providing the desired service. Here, in order to manage the information regarding from which server process on which processor has the desired service been received, a process called name server or directory server has been utilized conventionally.

The name server manages the information regarding which server process is providing a service having what name, such that when the client process wishing to receive the desired service transmits the name of the desired service to be received, the name server returns the information on the server process which can provide the desired service and the processor on which this server process is present. There is also a type of a name server with an enhanced function in which each service is associated with various attributes such that the name of the desired service and its attributes transmitted from the client process are pattern matched in the name server.

However, in a conventional distributed processing system, the target server process has been selected according to the pattern matching of the name of the service alone or the name of the service and the associated attributes, so that it has been impossible to make a selection of the server process according to more sophisticated conditions that cannot be accounted by the simple pattern matching procedure.

Now, in such a distributed processing system, a transaction processing has been utilized for the purpose of improving the reliability of the system.

In the transaction processing, the processings are executed in units of transactions, and in each transaction, a series of processings are completed by executing a plurality of processes related to application programs, database management system, etc. Here, a plurality of processes to be executed in each transaction may be distributed over a plurality of processors connected through channels or a network.

For example, as shown in FIG. 1, a plurality of processes 342 to be executed may be provided on a single processor 34 for executing processings in the transaction processing, along with a transaction manager 341 for managing the processings.

On the other hand, as shown in FIG. 2, in a case of executing a transaction processing distributed over a plurality of processors, each processor 351 has a plurality of processes 352 to be executed in a transaction along with a transaction manager 351 for managing the processings on that processor 35, such that the transaction managers 351 manages the entire transaction by communicating with each other.

In such a transaction processing, the transaction manager function to control the execution of the transaction in such a manner that each transaction has the following properties.

(1) Atomicity

The atomicity guarantees either that each processing can be executed completely, or in a case each processing cannot be executed completely, that an incomplete execution of each processing does not affect subsequent processings.

(2) Consistency

The consistency guarantees that a transition is made from one consistent state to another consistent state as a result of the execution of the transaction.

(3) Isolation

The isolation guarantees that results of a plurality of processings to be executed in parallel are identical to those obtained by executing these processings in series in an arbitrary order.

(4) Durability

The durability guarantees that the result obtained by executing each processing completely can be recovered even when an accident occurs.

In order to realize the transaction having these four properties, the transaction manager carries out a commit processing. The most representative and widely used protocol for this commit processing is a so called two-phase commit protocol, but there are many variations of this two-phase commit protocol such as three-phase commit protocol.

For example, for a transaction processing in a processor 36 shown in FIG. 3 which has a transaction manager 361 and two processes 362 and 363 to be executed in the transaction, a commit processing in a two-phase commit protocol is carried out according to a timing chart of FIG. 4 as follows.

Here, when the execution of the transaction is completed, the transaction manager 361 carries out the following commit processing with respect to each of the processes 362 and 363 executed in the transaction. In this case, the commit processing includes two phases of a vote phase and a decision phase.

In the vote phase, the transaction manager 361 transmits a vote request (VOTE-REQ) to each of the processes 362 and 363, in order to inquire whether each process can be completed properly or not, and in response to this vote request from the transaction manager 361, each of the processes 362 and 363 returns a reply in a form of either one of YES or NO to the transaction manager 361. In a case of returning the reply YES, each process records the result of the execution into a log memory, such that the execution result can be recovered in a case of an accident, before the reply YES is actually returned. In a case there is an accident or a trouble which prevent the proper completion of each process, the process returns the reply NO. When the transaction manager 361 receives all the replies from all the processes involved, the vote phase is finished and the commit processing enters into the decision phase.

In the decision phase, the transaction manager 361 transmits a commit request (COMMIT) to each process only when the replies received from all the processes are replies YES, as in a case shown in FIG. 4. When the commit request is received from the transaction manager 361, each process regards the transaction as being completed properly, and carries out the permanent data update operation.

On the other hand, when there is at least one process which returned the reply NO, as in a case shown in FIG. 5, it implies that the transaction cannot be completed properly, so that the transaction manager 361 transmits an abort request (ABORT) for commanding the cancellation of the transaction to each process. When the abort request is received from the transaction manager 361, each process carries out the operation to cancel out the data update due to the transaction, so as to guarantee the atomicity of the transaction.

In a case the processes to be executed in the transaction are distributed over a plurality of processors, as shown in FIG. 6 in which the transaction is distributed over a processor 37A including a transaction manager 371 and a process 372 and a processor 37B including a transaction manager 373 and a process 374, the commit processing is carried out according to a timing chart of FIG. 7. In this timing chart of FIG. 7, the transaction manager 371 on the processor 37A transmits the vote request to the transaction manager 373 of the processor 37B, and the reply from the processor 374 of the processor 37B is transmitted from the transaction manager 373 to the transaction manager 371. Thus, the commit processing by the transaction manager 371 on one processor 37A for the process 374 on the other processor 37B is carried out through the transaction manager 373 on the other processor 37B.

Now, this type of the commit processing can be used for each of transactions 41A and 41B as shown in FIG. 8 which form mutually independent processing units.

On the other hand, there is a type of a transaction called a nested transaction as disclosed in J. Eliot B. Moss, "Nested Transactions—An Approach to Reliable Distributed Computing", The MIT Press, 1985. In the nested transaction, one transaction can be represented as a combination of a plurality of smaller transactions, by providing a hierarchical order among a plurality of transactions 421 to 425 using a nested structure as shown in FIG. 9. Here, as shown in FIG. 10, a most superior transaction 431 of the nested structure is referred to as a top level transaction, while inferior transactions 432 to 434 are referred to as sub-transactions. The nested structure formed by a top level transaction and sub-transactions is also called a transaction family.

In such a nested transaction, the management between the transaction families can be made in an identical manner as the management between non-nested transactions. In addition, by guaranteeing the atomicity, consistency, isolation, and durability among the sub-transactions of each transaction family just as among the non-nested transactions, it becomes possible for the nested transaction to execute a plurality of sub-transactions in parallel, and to localize the abort due to the trouble at a level of the sub-transactions.

In order to realize such a nested transaction, as shown in FIG. 11, it is necessary for each processor 45 to be equipped with a transaction manager 451 capable of managing a nested transaction, a process 452 capable of executing a nested transaction, and a process 453 incapable of executing a nested transaction. In a case a plurality of processes are to be distributed over a plurality of processors, as shown in FIG. 12, a transaction manager 461 capable of managing a nested transaction and a process 462 capable of executing a nested transaction can be provided on one processor 46A, separately from another transaction manager 463 capable of managing a nested transaction and a process 464 incapable of executing a nested transaction which are provided on another processor 46B.

In the nested transaction processing, the commit processing should be divided into a commit processing for the top level transaction, and a commit processing for the sub-transactions. Namely, for a case shown in FIG. 13 in which the top level transaction T 441 and the sub-transaction S 442 are executed by the respective processes, the commit processing can be carried out according to the timing charts shown in FIG. 14 and FIG. 15 as follows. Here, the timing chart of FIG. 14 is for the management by a transaction manager provided on a processor on which the processes for the top level transaction T and the sub-transaction S are commonly provided as in a case shown in FIG. 11, while the timing chart of FIG. 15 is for the management by difference transaction managers provided separately on separate processors on which the processes for the top level transaction T and the sub-transaction S are provided separately as in a case shown in FIG. 12.

In either case, first, the commit processing for the sub-transaction S is carried out. In the cases shown in FIG. 14 and FIG. 15, the fact that the sub-transaction has been committed is internally recorded, without making any command with respect to the processes. In a case of the commit for the sub-transaction, this type of operation in which no particular action is made is often employed, although it is also possible to carry out the operation in the usual two-phase commit protocol as described above for the sub-transaction.

Then, the commit processing for the top level transaction T is carried out in a manner similar to a case of non-nested transactions as described above. Here, however, in a case of the commit for the top level transaction, it is necessary to record the updated data for all the sub-transactions of the top level transaction along with the updated data for the top level transaction itself. Similarly, in a case of the abort for the top level transaction, it is necessary to abort all the sub-transactions of the top level transaction along with the top level transaction itself.

Thus, in the nested transaction, the commit for the sub-transaction is only a tentative one which can be affected by the state of the superior transaction, so that the process capable of executing a nested transaction differs from the process incapable of executing a nested transaction in that it must be capable of carrying out an execution according to the control by the transaction manager to realize such a commit processing.

However, in a conventional transaction processing system, in order to carry out the nested transaction processing, the processor must be equipped with a transaction manager capable of managing a nested transaction and a process capable of executing a nested transaction. For this reason, in order to utilize the process for already existing database management system or application program which is incapable of executing a nested transaction in the nested transaction processing, it has been necessary to rewrite the program of the process for already existing database management system or application program to make it capable of executing a nested transaction.

In addition, it has conventionally been impossible to make a transaction processing in which a processor equipped with a transaction manager incapable of managing a nested transaction and a process incapable of executing a nested transaction is combined with a processor equipped with a transaction manager capable of managing a nested transaction and a process capable of executing a nested transaction.

SUMMARY OF THE INVENTION

It is therefore an object of the present invention to provide a flexible distributed processing system capable of making a selection of the server process according to more sophisticated conditions that cannot be accounted by the simple pattern matching procedure.

It is another object of the present invention to provide a transaction processing system suitable for dealing with a nested transaction, which is compatible with already existing transaction manager and process incapable of dealing with a nested transaction.

According to one aspect of the present invention there is provided a method of distributed processing among processors, where each processor having a server process for providing services and a service manager for managing the services provided by the server process, the method comprising the steps of: registering each of the services provided by all server processes of the processors to the service manager on each processor in correspondence with an executability condition for judging an executability of each service; transmitting an inquiry concerning a desired service to be received, from a client process to the service manager on one of the processors; selecting one of the server processes which is providing the desired service indicated by the inquiry transmitted from the client process at the transmitting step and which is judged to be executable according to the executability condition registered at the service manager on said one of the processors; and requesting the desired service from the client process to said one of the server processes selected at the selecting step.

According to another aspect of the present invention there is provided a distributed processing system, comprising: a client process for requesting a desired service to be received, provided on one processor; and a plurality of processors, where each processor having: a server process for providing services; and a service manager for managing the services provided by the server process by registering each of the services provided by all server processes of the processors to the service manager on each processor in correspondence with an executability condition for judging an executability of each service, the service manager receives an inquiry concerning the desired service from the client process, and selects one of the server processes which is providing the desired service indicated by the inquiry transmitted from the client process and which is judged to be executable according to the executability condition registered; wherein the client process requests the desired service to said one of the server processes selected by the service manager.

According to another aspect of the present invention there is provided a method of managing transaction processing in a transaction processing system including processes capable of executing nested transaction, processes incapable of executing nested transaction, and a transaction manager capable of managing nested transaction, comprising the steps of: (a) executing sub-transactions of the nested transaction; (b) carrying out a commit processing only for the processes of the sub-transactions which are capable of executing the nested transaction, after the step (a); (c) executing a top level transaction of the nested transaction after the step (b); (d) carrying out a commit processing for the top level transaction after the step (c); and (e) completing a commit processing for the processes of the sub-transactions which are incapable of executing the nested transaction, concurrently with a completion of the commit processing for the top level transaction at the step (d).

Other features and advantages of the present invention will become apparent from the following description taken in conjunction with the accompanying drawings.

BRIEF DESCRIPTION OF THE DRAWINGS

FIG. 7 is a timing chart for an exemplary operation of the conventional transaction processing in the processor of FIG. 6 in a case of commitment.

FIG. 22 is a diagram illustrating a service management table used in a service manager of the distributed processing system of FIG. 21.

FIG. 23 is a schematic block diagram of a fifth embodiment of a distributed processing system according to the present invention.

FIG. 24 is a diagram illustrating a service management table used in a service manager of the distributed processing system of FIG. 23.

DETAILED DESCRIPTION OF THE PREFERRED EMBODIMENTS

Figure 1:
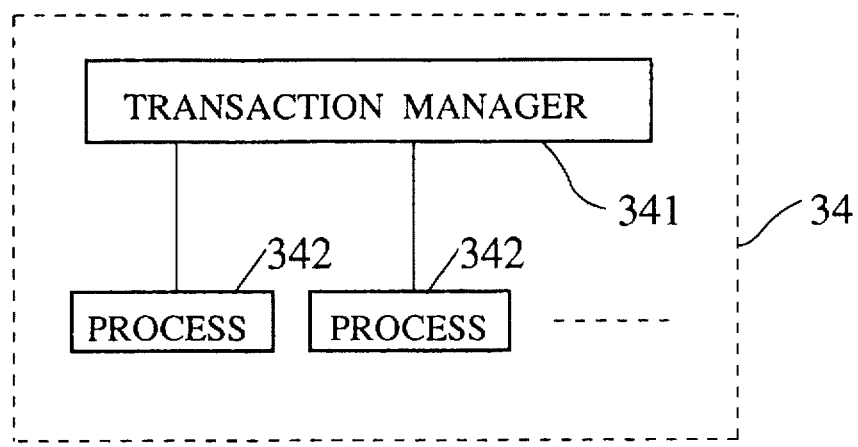
FIG. 1 is a schematic diagram of one example of a configuration of a processor for carrying out a conventional transaction processing.
Figure 2:
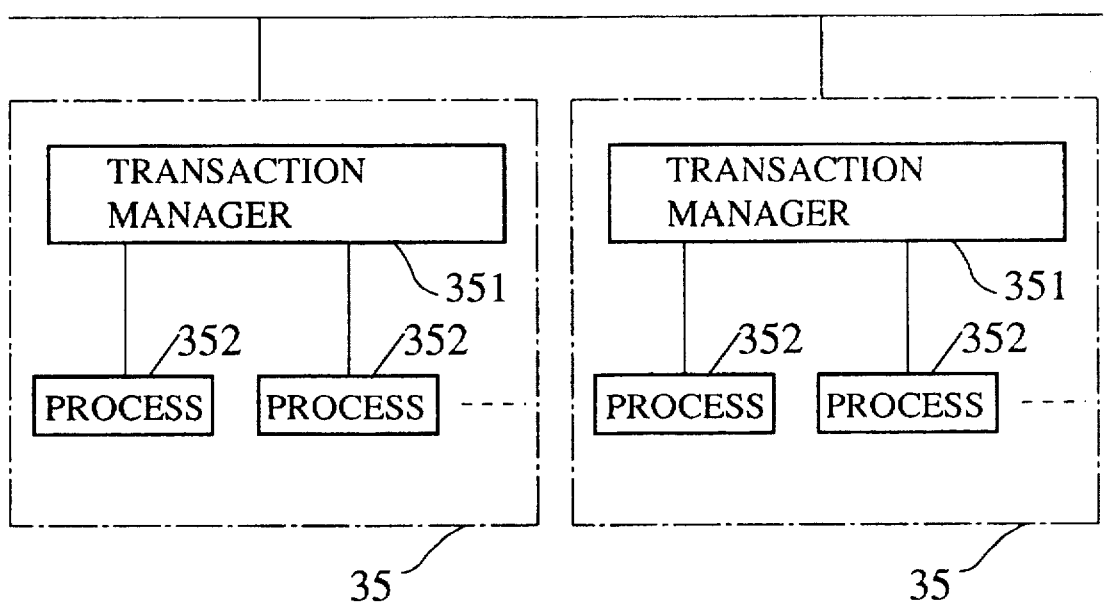
FIG. 2 is a schematic diagram of another example of a configuration of a processor for carrying out a conventional transaction processing.
Figure 3:
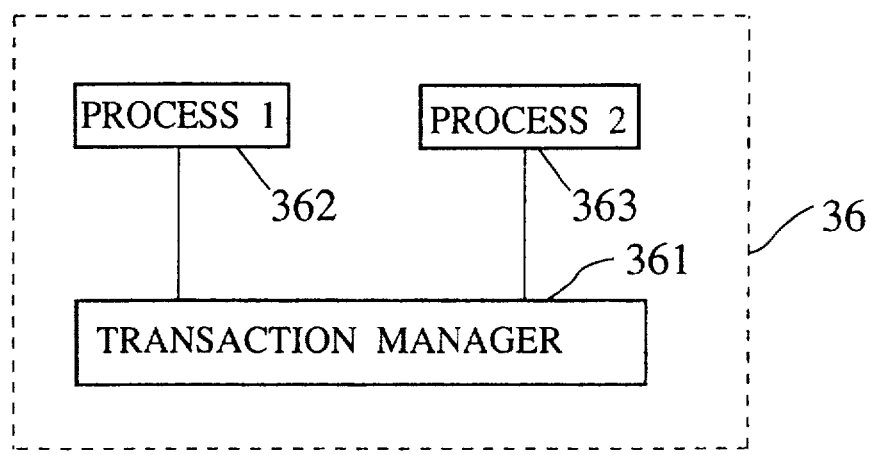
FIG. 3 is a schematic diagram of another example of a configuration of a processor for carrying out a conventional transaction processing.
Figure 6:
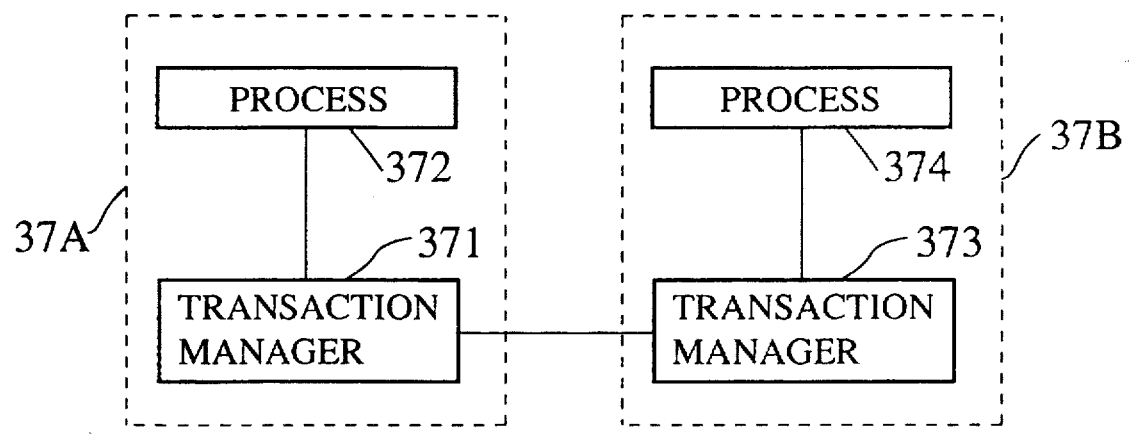
FIG. 6 is a schematic diagram of another example of a configuration of a processor for carrying out a conventional transaction processing.
Figure 4:
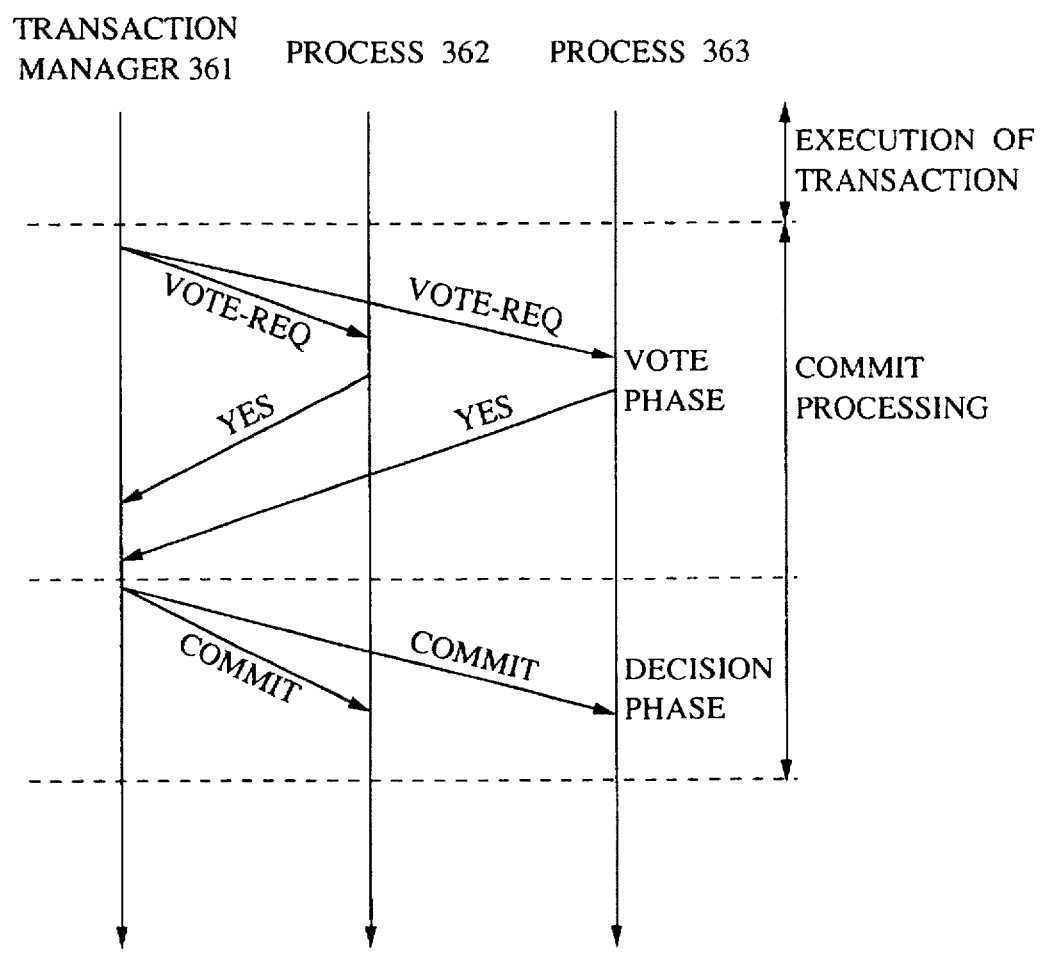
FIG. 4 is a timing chart for an exemplary operation of the conventional transaction processing in the processor of FIG. 3 in a case of commitment.
Figure 5:
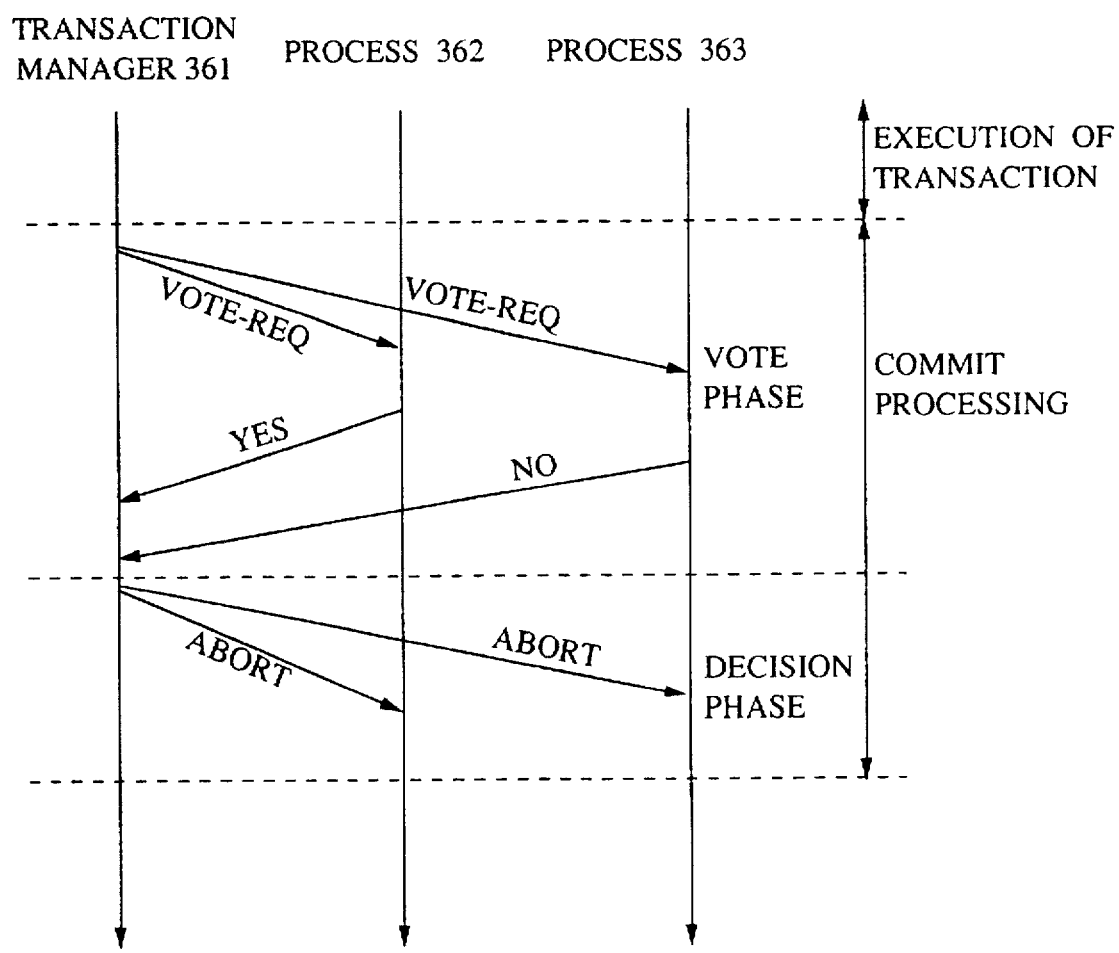
FIG. 5 is a timing chart for an exemplary operation of the conventional transaction processing in the processor of FIG. 3 in a case of abort.
Figure 8:
FIG. 8 is a schematic diagram of an example of a non-nested transaction.
Figure 9:
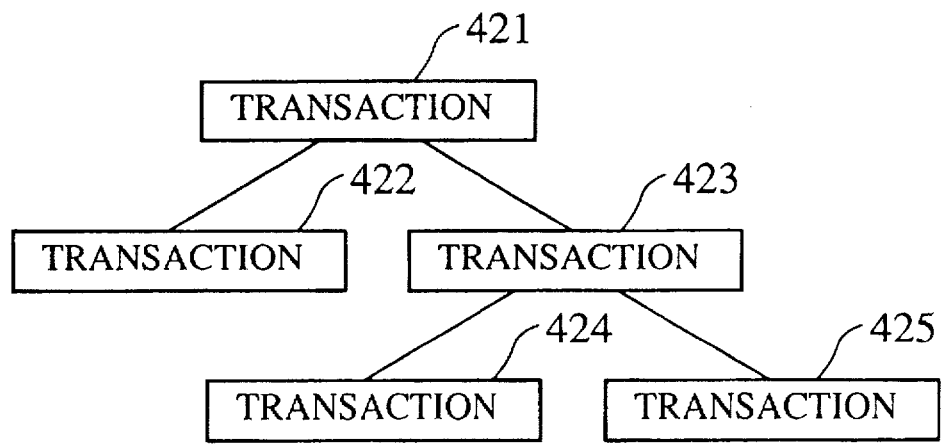
FIG. 9 is a schematic diagram of an example of a nested transaction.
Figure 10:
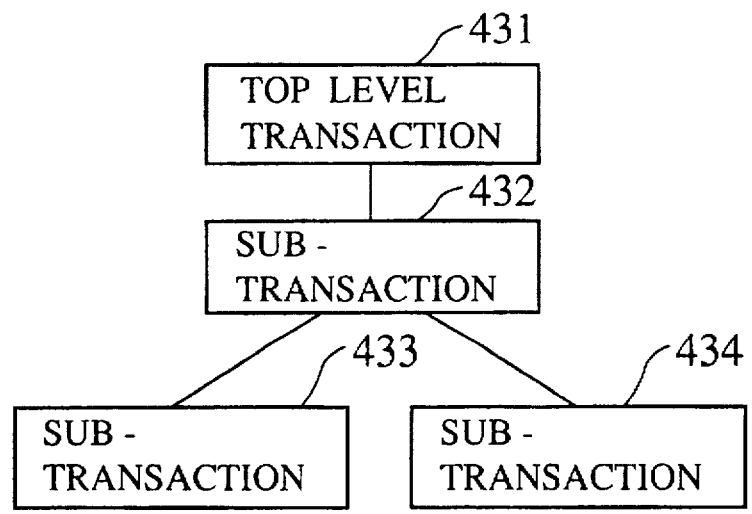
FIG. 10 is a schematic diagram of another example of a nested transaction.
Figure 11:
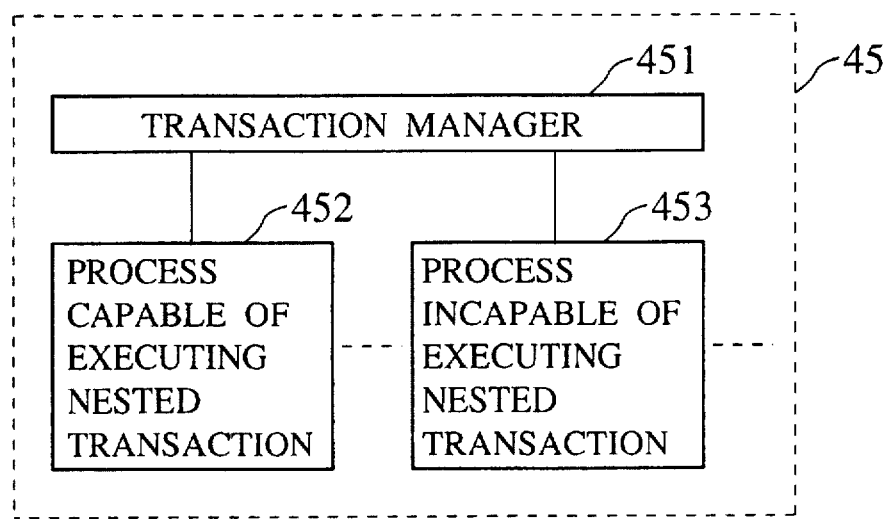
FIG. 11 is a schematic diagram of an example of a configuration of a processor for carrying out a conventional transaction processing for the nested transaction.
Figure 12:
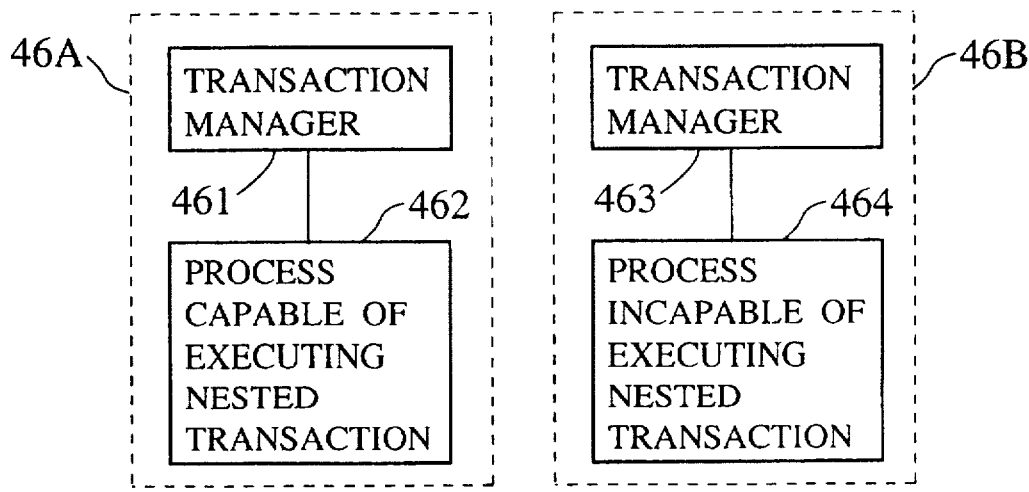
FIG. 12 is a schematic diagram of another example of a configuration of a processor for carrying out a conventional transaction processing for the nested transaction.
Figure 13:
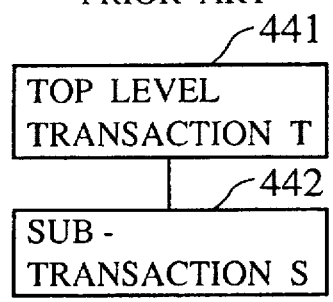
FIG. 13 is a schematic diagram of another example of a nested transaction.
Figure 14:
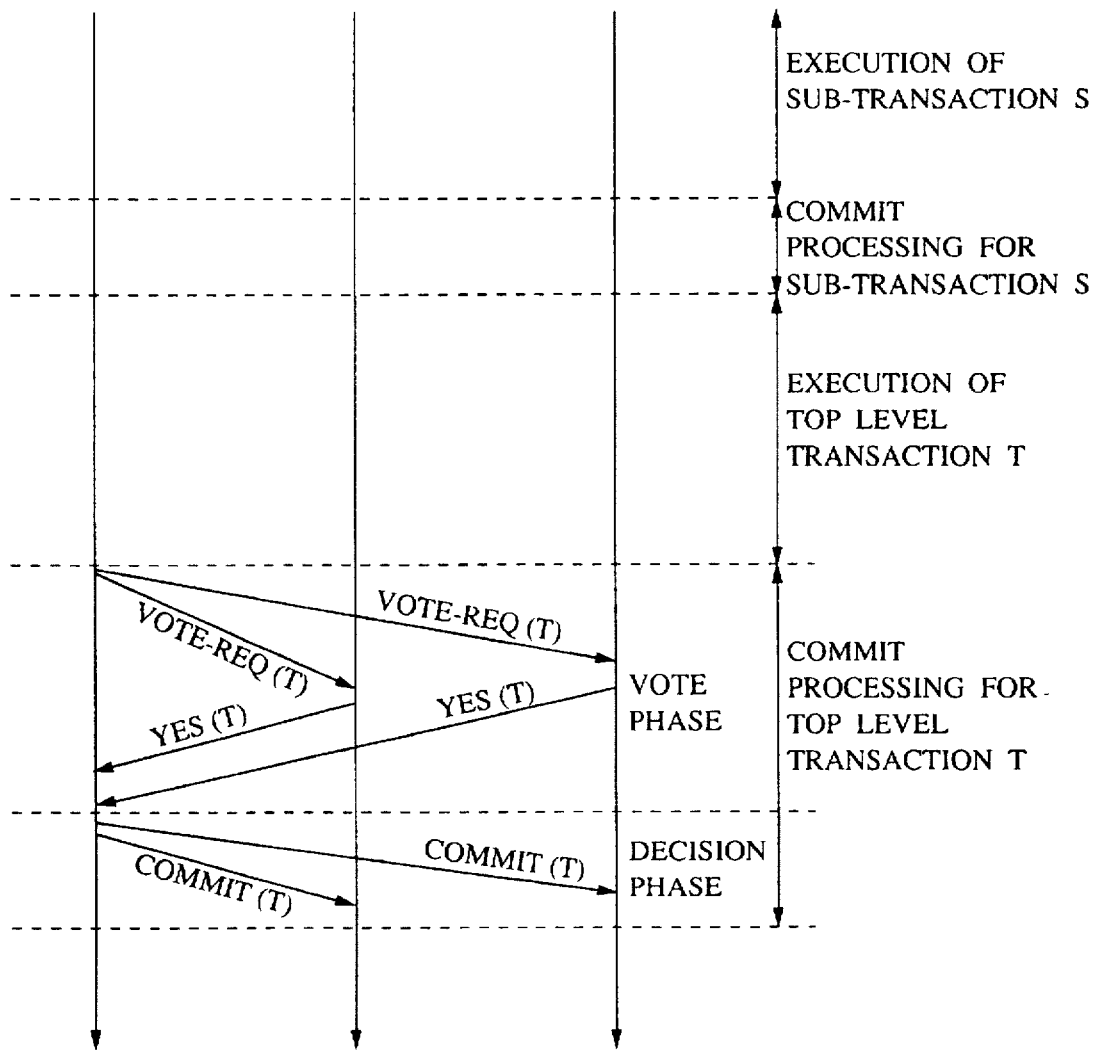
FIG. 14 is a timing chart for an exemplary operation of the conventional transaction processing for the nested transaction of FIG. 13 in the processor of FIG. 11 in a case of commitment.
Figure 15:
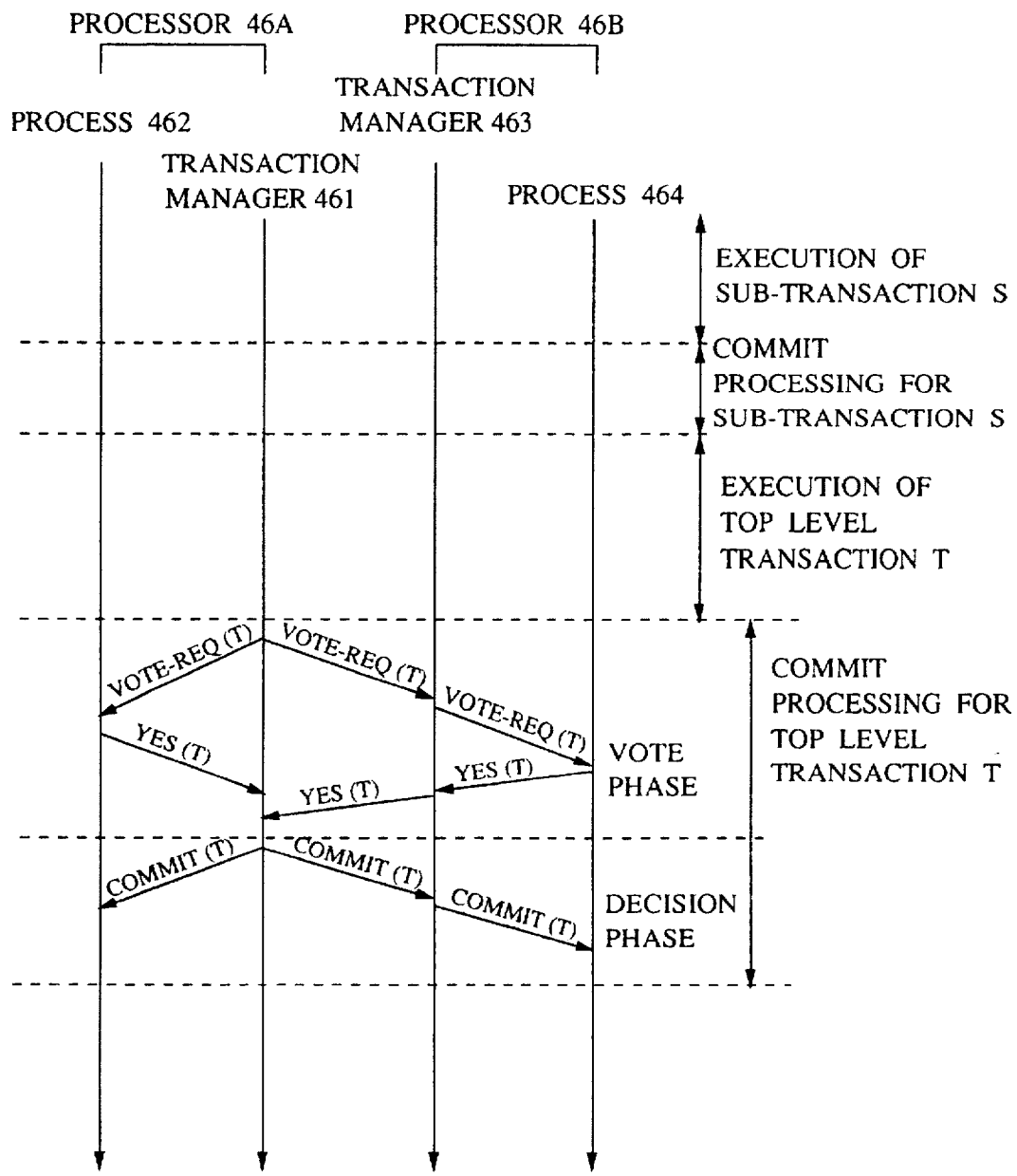
FIG. 15 is a timing chart for an exemplary operation of the conventional transaction processing for the nested transaction of FIG. 13 in the processor of FIG. 12 in a case of commitment.
Figures 16, 17:
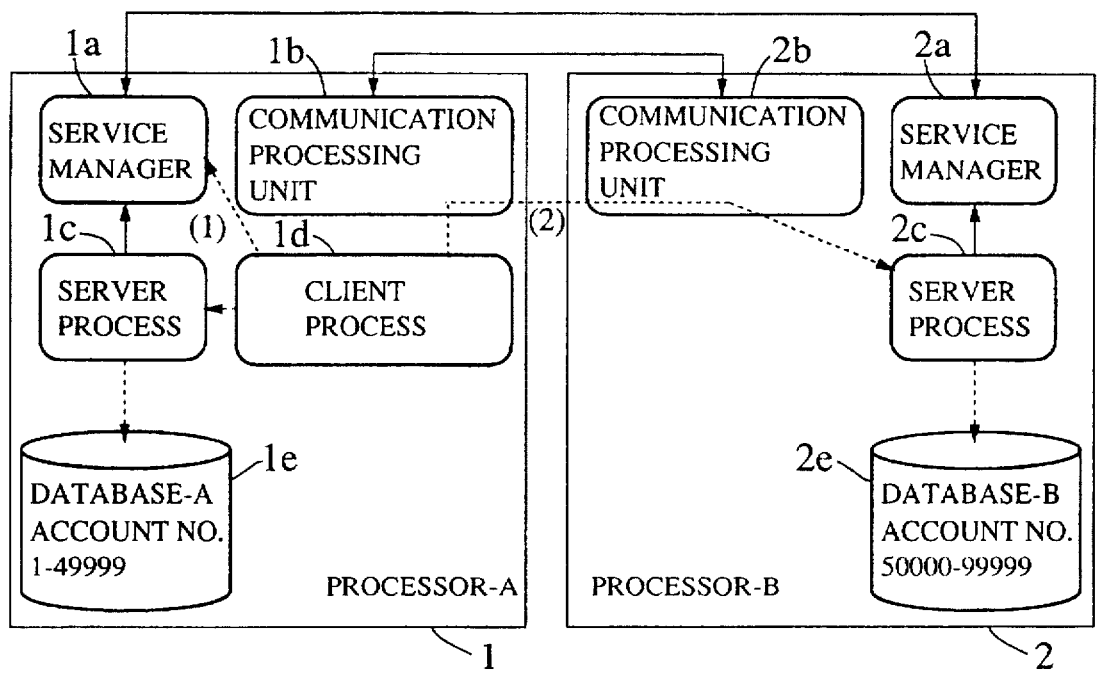
FIG. 16 is a schematic block diagram of a first embodiment of a distributed processing system according to the present invention.
FIG. 17 is a diagram illustrating a service management table used in a service manager of the distributed processing system of FIG. 16.

Referring now to FIG. 16, a first embodiment of a distributed processing system according to the present invention will be described in detail.

In this first embodiment, the system comprises: a processor-A 1 having a service manager 1a, communication processing unit 1b, a server process 1c, a client process 1d, and a database-A 1e for storing data for account numbers 1 to 49999; and a processor-B 2 having a service manager 2a, communication processing unit 2b, a server process 2c, and a database-B 2e for storing data for account numbers 50000 to 99999.

Each of the server processes 1c and 2c has a name "Teller", and carries out two types of service processings including "Deposit" and "Withdraw" with respect to the database-A 1e and database-B 2e, respectively. Each of the server processes 1c and 2c also registers the executable services and judgement procedures for judging the executability of each of the executable services in the respective processors to the service managers 1a and 2a, respectively, before the services are actually provided.

Here, for example, the server process 1c on the processor-A 1 can make the registration of the executable services and their executability judgement procedures with respect to the service manager 1a by executing the following instructions.

add__service("Teller", "Deposit", "(1<=arg1)&&(arg1<= 49999)");

add__service("Teller", "Withdraw", "(1<=arg1)&& (arg1<=49999)");

where arg1 represents the account number of the requested service.

According to these instructions, the service manager 1a can judge that the server process 1c is capable of executing the service of "Deposit" or "Withdraw" when the condition of "(1<=arg1)&&(arg1<=49999)" is satisfied.

Similarly, the server process 2c on the processor-B 2 can make the registration of the executable services and their executability judgement procedures with respect to the service manager 2a by executing the following instructions.

add_service("Teller", "Deposit", "(50000<=arg1)&&(arg1<=99999)");
add_service("Teller", "Withdraw", "(50000<=arg1)&&(arg1<=99999)");

In response to such a registration of the executable services and their executability judgement procedures, each of the service managers 1a and 2a informs the registered content to the other one of the service managers 1a and 2a, such that each of the service managers 1a and 2a possesses a service management table as shown in FIG. 17 in which each entry comprises a processor name, a server name, a service name, and a judgement procedure, for all the executable services on each server process registered by the server processes 1c and 2c.

Then, in a case the client process 1d on the processor-A 1 wishes to make a deposit of ¥5000 to an account having an account number 71042, the client process 1d makes the inquiry for the appropriate server process for the desired service to the service manager 1a by using the following instruction as indicated by a dashed line (1) in FIG. 16.

lookup("Deposit", 71042, 5000);

In response to this inquiry, the service manager 1a looks up the entries in the service management table of FIG. 17 in which the registered service name indicates the requested service of "Deposit", which in this case are the first and third entries. Then, the service manager 1a applies the executability judgement procedure registered for each of these first and third entries to the requested service of this inquiry to find the entry for which the condition given by the registered executability judgement procedure is satisfied by the requested service of this inquiry, which in this case is the third entry. Consequently, the service manager 1a returns a reply indicating that the requested service is executable by the server process 2c on the processor-B 2 to the client process 1d.

Then, in accordance with this reply from the service manager 1a, the client process 1d makes the service request for the desired service directly to the server process 2c on the processor-B 2 as indicated by a dashed line (2) in FIG. 16.

Here, the client process 1d can determine the target server process to which the service request is to be made regardless of whether the target server process in provided on the same processor or on the different processor. It is also possible for the client process 1d to memorize this information on the target server process in its memory region, such that the inquiry to the service manager can be omitted at a time of receiving the same service later on.

It is to be noted that, when the service manager looks up the service management table in order to find out the server process capable of providing the service requested by the client process, there may be cases in which a plurality of entries in the service management table to have the registered judgement procedures which can be satisfied by the inquiry. In such a case, it becomes necessary to select one of these entries according to any one of the following procedures.

(1) The selection is made at random.

(2) The selection is made according to a predetermined order such as an order of entries in the service management table.

(3) The selection is made by attaching a higher priority to the entry which has not been selected recently.

(4) The selection is made by attaching a higher priority to the entry for the server process which exerts a smaller load to the processor.

In a case of adopting the procedure (4), it becomes necessary for each processor to inform the loading state to the other processors, or to check the loading states of the other processors, regularly.

For example, the so called UNIX operating system usually possesses a "ruptime" function for inquiring the load average, so that this function can be utilized in assessing the loading state. For instance, it becomes possible to make the judgement procedure itself to be capable of reflecting the loading state by utilizing this "ruptime" function. It is also possible to make the judgement procedure to make the judgement regardless of the loading state, and the service manager to multiply the results of the judgement procedures with the weights determined according to the loading states assessed by using this "ruptime" function.

It is also to be noted here that this first embodiment may be modified such that the judgement procedure can reflect the prescribed priority levels among the server processes.

It is further to be noted that the service manager may be realized either as a separate process or as a part of the basic software such as OS.

Figure 18:
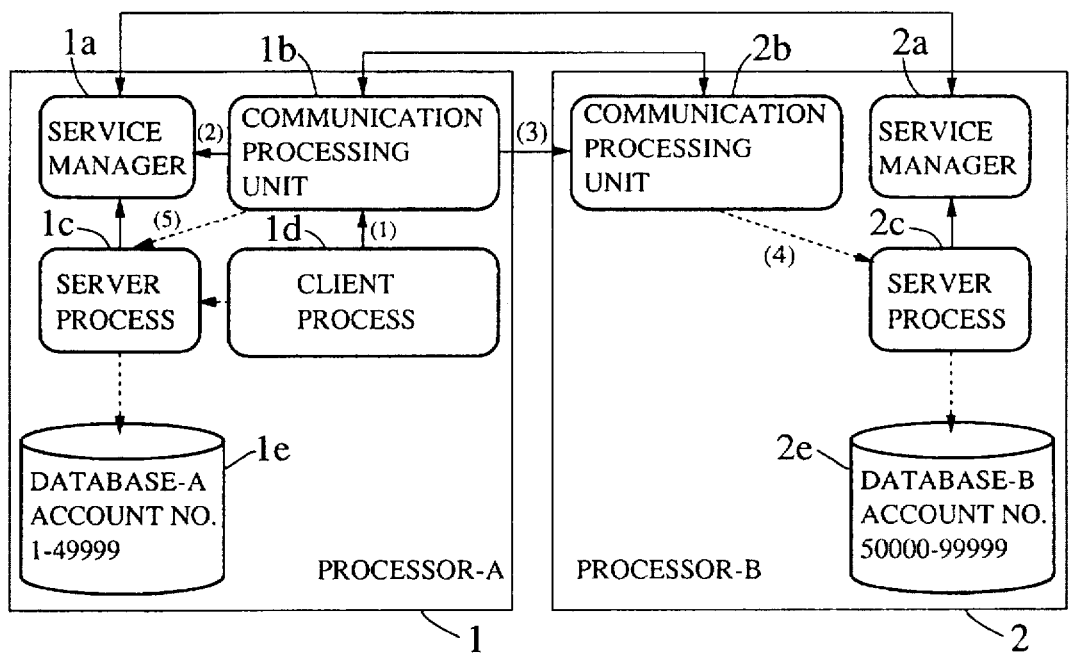
FIG. 18 is a schematic block diagram of a second embodiment of a distributed processing system according to the present invention.

Referring now to FIG. 18, a second embodiment of a distributed processing system according to the present invention will be described in detail. Here, those elements which are substantially equivalents to the corresponding elements in the first embodiment of FIG. 16 described above will be given the same reference numerals in the figures, and their descriptions will be omitted.

This second embodiment differs from the first embodiment of FIG. 16 described above in that the client process 1d does not make the service request for the desired service directly to the server process capable of executing the requested service, but makes the service request through the communication processing unit 1b as indicated by a dashed line (1) shown in FIG. 18.

In response, the communication processing unit 1b makes the inquiry to find the server process capable of executing the requested service to the service manager 1a as indicated by a dashed line (2) shown in FIG. 18. The service manager 1a operates similarly to the first embodiment described above, and returns the appropriate service process capable of executing the requested service to the communication processing unit 1b.

Then, in a case the appropriate server process is the server process 2c present on the other processor-B 2, the communication processing unit 1b transmits the service request for the desired service to the communication processing unit 2b on the processor-B 2 as indicated by a dashed line (3) shown in FIG. 18, such that the communication processing unit 2b makes the service request for the desired service to the server process 2c as indicated by a dashed line (4) shown in FIG. 18. On the other hand, in a case the appropriate server process is the server process 1c present on the same processor-A 1, the communication processing unit 1b makes the service request for the desired process to the server process 1c directly, as indicated by a dashed line (5) shown in FIG. 18.

This second embodiment has an advantage that the service manager and the communication processing unit can be realized as an integral module.

Figure 19:
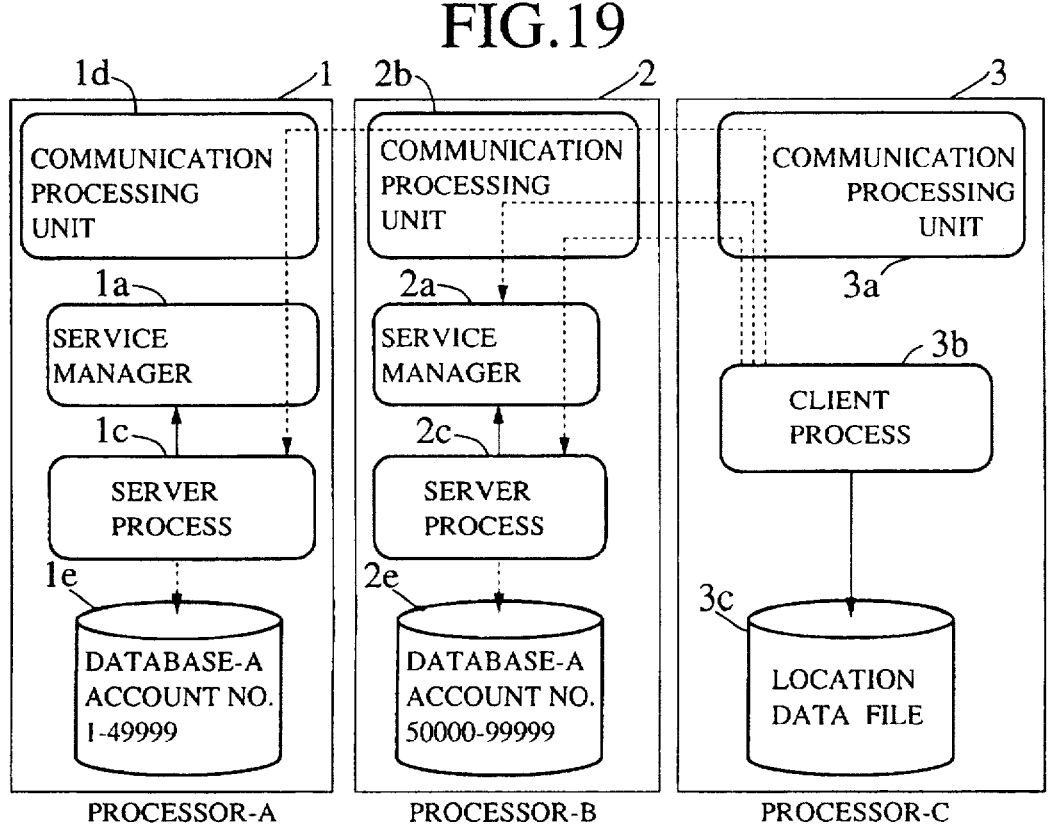
FIG. 19 is a schematic block diagram of a third embodiment of a distributed processing system according to the present invention.

Referring now to FIG. 19, a third embodiment of a distributed processing system according to the present invention will be described in detail. Here, those elements which are substantially equivalents to the corresponding elements in the first embodiment of FIG. 16 described above will be given the same reference numerals in the figures, and their descriptions will be omitted.

This third embodiment differs from the first embodiment of FIG. 16 described above in that the client process is not provided on the processor-A 1, and there is provided another processor-C 3 equipped with a communication processing unit 3a, a client process 3b, and a location data file 3c.

Figures 20, 21:
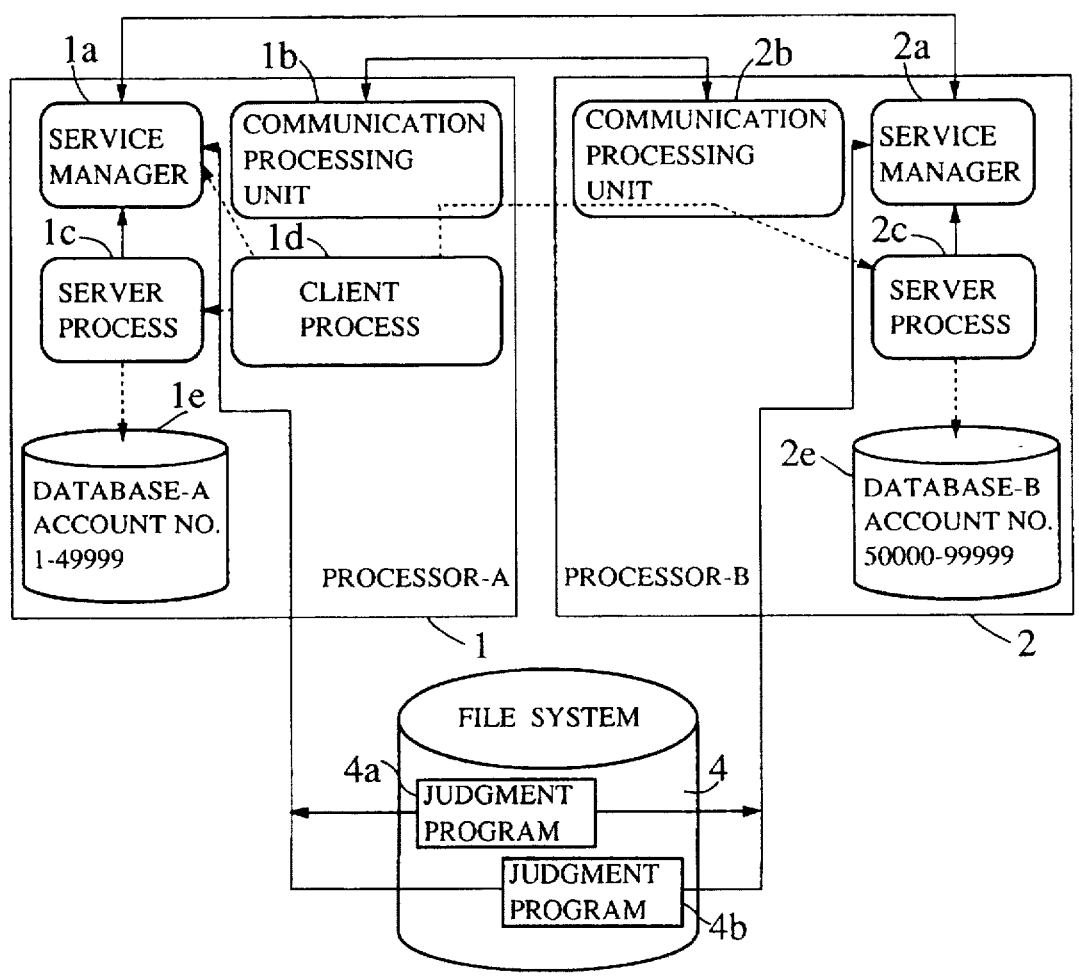
FIG. 20 is a diagram illustrating data stored in a location data file of the distributed processing system of FIG. 19.
FIG. 21 is a schematic block diagram of a fourth embodiment of a distributed processing system according to the present invention.

In this configuration of FIG. 19, the location data file 3c stores the information on the locations of the service managers on the other processors in a format shown in FIG. 20 in which a name of each service manager is stored in correspondence to a name of the processor on which this service manager is provided. Here, in a case of realizing each service manager as a process, a name of the process may be enlisted instead of the name of the service manager itself.

Consequently, the client process 3b on the processor-C 3 is capable of making the registration of the service and the inquiry for the appropriate server process to the service managers provided on the other processors by utilizing the information stored in the location data file 3c.

Thus, according to this third embodiment, it becomes possible to deal with the client process provided on a processor not equipped with a service manager.

Referring now to FIG. 21, a fourth embodiment of a distributed processing system according to the present invention will be described in detail. Here, those elements which are substantially equivalents to the corresponding elements in the first embodiment of FIG. 16 described above will be given the same reference numerals in the figures, and their descriptions will be omitted.

This fourth embodiment differs from the first embodiment of FIG. 16 in that there is provided a file system 4 for storing a plurality of executability judgement programs 4a and 4b for the server processes 1c and 2c on the processor-A 1 and the processor-B 2, respectively, which is provided separately from the processor-A 1 and the processor-B 2.

In this configuration of FIG. 21, at a time of the registration of the service, the server process informs a file name in the file system 4 which stores the appropriate executability judgement program for this server process to the service manager instead of the executability judgement procedure used in the first embodiment described above, and then, the service manager reads the appropriate executability judgement program from the file system 4 according to the informed file name and makes the judgement of the executability of each service according to this executability judgement program.

Consequently, each of the service managers 1a and 2a in this fourth embodiment possesses the service management table as shown in FIG. 22 in which each entry comprises a processor name, a server name, a service name, and a name of the executability judgement program, for all the executable services on each server process registered by the server processes 1c and 2c.

Here, for example, the services "Deposit" and "Withdraw" in the service manager 1a are associated with the following executability judgement program.

```
constA(int m, int d) {
    if (1 <= m && m <= 49999) return(TRUE);
    else return(FALSE);
}
```

In this fourth embodiment, in response to the inquiry made by the client process 1d, the service manager reads the appropriate executability judgement program from the file system 4 and judges the executability of each service according to this executability judgement program. For example, in response to the inquiry from the client process in a form of:

lookup("Deposit", 39012, 5000);

the executability judgement program takes a form of:

constA(39012, 5000);

which returns the answer "TRUE", so that the service manager can return a reply indicating that the server process 1c on the processor-A 1 is capable of executing the requested service to the client process 1d.

Referring now to FIG. 23, a fifth embodiment of a distributed processing system according to the present invention will be described in detail. Here, those elements which are substantially equivalents to the corresponding elements in the first embodiment of FIG. 16 described above will be given the same reference numerals in the figures, and their descriptions will be omitted.

This fifth embodiment differs from the first embodiment of FIG. 23 in that the database-A 1e and the database-B 2e are not provided on the processor-A 1 and the processor-B 2, and there is provided a common database 5 for storing the data for the account numbers 1 to 99999, with respect to the processor-A 1 and the processor-B 2, such that the server processes 1c and 2c provide the same services.

In this case, each of the service managers 1a and 2a possesses the service management table as shown in FIG. 24 in which each entry comprises a processor name, a server name, a service name, and a judgement procedure, for all the executable services on each server process registered by the server processes 1c and 2c.

Then, the service manager makes the selection of the appropriate server process capable of executing the service requested by the client process 1d according to the loading state of the server process or the processor on which the server process is present.

Thus, in this fifth embodiment, when a plurality of server processes providing the same services are included, it becomes possible to distribute the load among these server processes by selecting the less loaded one of these server processes.

As described in the first to fifth embodients above, according to the present invention, it becomes possible to realize a distributed processing system capable of making a selection of the appropriate server process according to more sophisticated conditions that cannot be accounted by the simple pattern matching procedure, by utilizing the executability judgement procedure or the executability judgement program assigned to each service in advance which can express the conditions on the arguments of the server process such as the account number, so as to realize the distribution of the loads or the functions over a plurality of processors according to such sophisticated conditions.

Figures 25, 26:
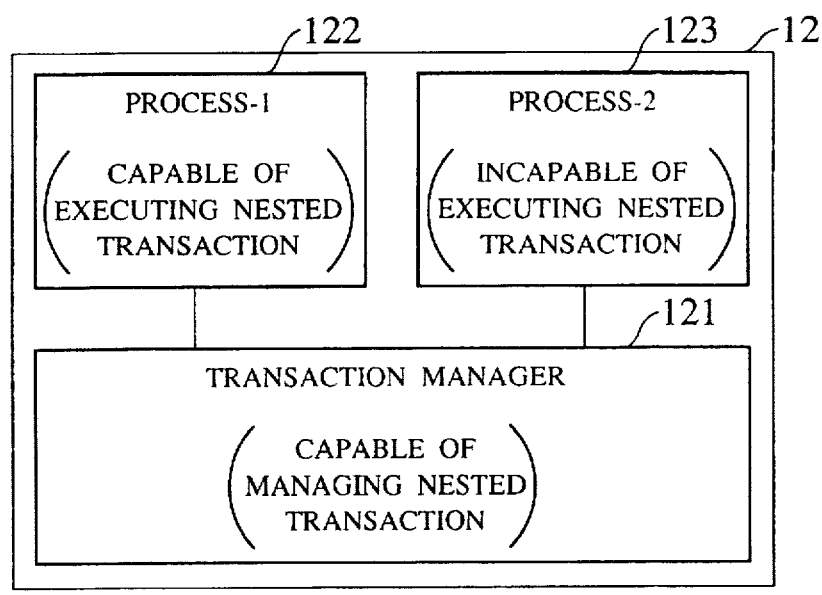
FIG. 25 is a schematic diagram of an exemplary configuration of a processor for a transaction processing system according to the present invention.
FIG. 26 is a diagram illustrating tables used in a transaction manager on the processor of FIG. 25.

Referring now to FIG. 25, a first embodiment of a transaction processing system according to the present invention, which can be utilized in the distributed processing system of the present invention described above, will be described in detail.

This first embodiment concerns with a case of managing the nested transaction formed by a top level transaction T and its sub-transaction S, on a processor 12 having a transaction manager 121 capable of managing the nested transaction, a process-1 122 capable of executing the nested transaction, and a process-2 123 incapable of executing the nested transaction.

In this case, as shown in FIG. 26, the transaction manager 121 has two tables of a process table 1211 and a transaction table 1212. The process table 1211 enlists process numbers of the processes to be executed in the transaction processing on this processor 12 along with hierarchy flags indicating whether each of the processes to be executed in the transaction processing on this processor 12 is capable of executing the nested transaction or not. On the other hand, the transaction table 1212 enlists a transaction identifier such as T or S for each transaction to be executed, the transaction identifier of a parent transaction of each transaction, a state of each transaction indicating whether each transaction is in execution or committed, and the process numbers of the processes to be executed in each transaction.

Now, in this first embodiment, the transaction manager 121 carries out the commit processing by using these two tables according to the timing chart of FIG. 27 as follows.

Namely, when the execution of the sub-transaction S is completed, the commit processing for the sub-transaction S is carried out by the transaction manager 121, only for the processes of the sub-transaction S which are capable of executing the nested transaction such as the process-1 122, while not carrying out the commit processing for the processes of the sub-transaction S which are incapable of executing the nested transaction such as the process-2 123.

At this point, the transaction manager 121 only records the commitment of the sub-transaction S in the transaction table 1212, without making any command with respect to the process-1 122 and the process-2 123, although it is also possible to carry out the operation in the usual two-phase commit protocol at this point.

Then, after the execution of the top level transaction T is completed, the transaction manager 121 carries out the commit processing for the top level transaction T, along with the commit processing for the processes of the sub-transaction S which are incapable of executing the nested transaction such as the process-2 123, according to the flow chart of FIG. 28 as follows.

First, at the step S141, whether it is the top level transaction or not is determined. When it is not the top level transaction, the process is terminated.

When it is the top level transaction, next at the step S142, a vote request VOTE-REQ(T) for the top level transaction T is transmitted to all the processes which are related to the top level transaction T and capable of executing the nested transaction, which in this case include the process-1 122.

Then, next at the step S143, a vote request VOTE-REQ(S) for the processes of the sub-transaction S which are incapable of executing the nested transaction is transmitted to all the processes which are related to any one of the sub-transaction S of the top level transaction T and incapable of executing the nested transaction, which in this case include the process-2 123.

Then, next at the step S144, whether the replies YES(T) or YES(S) are received from all the processes to which the vote requests VOTE-REQ(T) and VOTE-REQ(S) have been transmitted or not is determined.

Figure 27:
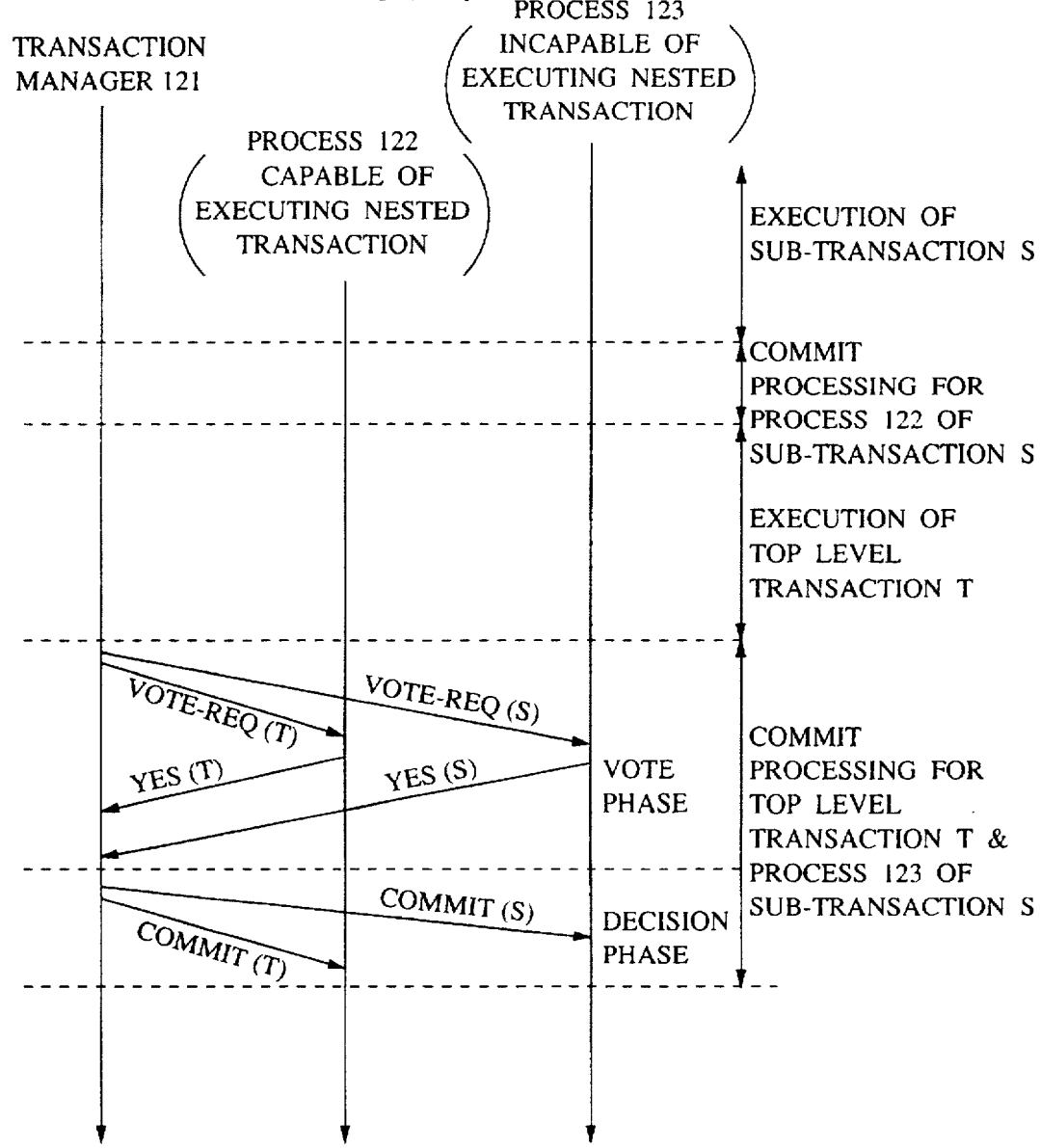
FIG. 27 is a timing chart for an exemplary operation of the transaction processing on the processor of FIG. 25 in a first embodiment of a transaction processing system according to the present invention, in a case of commitment.

When the replies YES(T) or YES(S) are received from all the processes to which the vote requests VOTE-REQ(T) and VOTE-REQ(S) have been transmitted, as shown in the timing chart of FIG. 27, the vote phase is finished and the commit processing proceeds to the following decision phase next.

Namely, in this case, in the decision phase, first at the step S145, a commit request COMMIT(T) for the top level transaction T is transmitted to all the processes which are related to the top level transaction T and capable of executing the nested transaction, which in this case include the process-1 122.

Then, next at the step S146, a commit request COMMIT (S) for the processes of the sub-transaction S which are incapable of executing the nested transaction is transmitted to all the processes which are related to any one of the sub-transaction S of the top level transaction T and incapable of executing the nested transaction, which in this case include the process-2 123, and the process is terminated.

On the other hand, when at least one reply NO(T) or NO(S) is received from any one of the processes to which the vote requests VOTE-REQ(T) and VOTE-REQ(S) have been transmitted, the vote phase is finished and the commit processing proceeds to the following decision phase next.

Namely, in this case, in the decision phase, first at the step S147, an abort request ABORT(T) for the top level transaction T is transmitted to all the processes which are related to the top level transaction T and capable of executing the nested transaction, which in this case include the process-1 122.

Then, next at the step S148, an abort request ABORT(S) for the processes of the sub-transaction S which are incapable of executing the nested transaction is transmitted to all the processes which are related to any sub-transaction S of the top level transaction T and incapable of executing the nested transaction, which in this case include the process-2 123, and the process is terminated.

In this manner, the commit processing for the entire transaction family can be completed.

Figures 29, 30A, 30B:
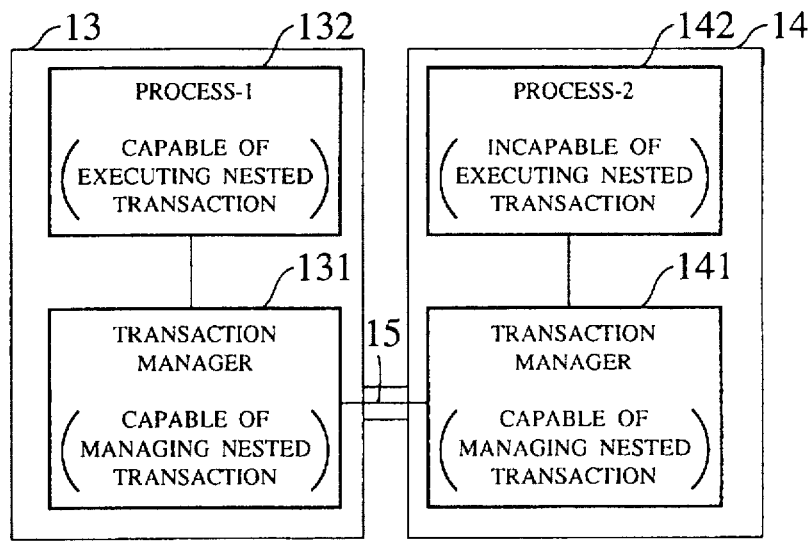
FIG. 29 is a schematic diagram of another exemplary configuration of a processor for a transaction processing system according to the present invention.
FIGS. 30A and 30B are diagrams illustrating tables used in two transaction managers on the processor of FIG. 29.

Now, the commit processing procedure similar to that of the first embodiment above is also applicable to a case of managing the nested transaction formed by a top level transaction T and its sub-transaction S on a configuration shown in FIG. 29, which includes: a processor 13 having a transaction manager 131 capable of managing the nested transaction and a process-1 132 capable of executing the nested transaction; and a processor 14 having a transaction manager 141 capable of managing the nested transaction and a process-2 142 incapable of executing the nested transaction; where the transaction managers 131 and 141 can communicate with each other through a communication connection 15.

In this case, as shown in FIG. 30A, the transaction managers 131 has two tables of a process table 1311 and a transaction table 1312. The process table 1311 enlists process numbers of the processes to be executed in the transaction processing on the processor 13 along with hierarchy flags indicating whether each of the processes to be executed in the transaction processing on the processor 13 is capable of executing the nested transaction or not. On the other hand, the transaction table 1312 enlists a transaction identifier such as T or S for each transaction to be executed, the transaction identifier of a parent transaction of each transaction, a state of each transaction indicating whether each transaction is in execution or committed, the process numbers of the processes to be executed in each transaction, and the node numbers indicating which other processor is this transaction related to.

Similarly, as shown in FIG. 30B, the transaction manager 141 has two tables of a process table 1411 and a transaction table 1412 in forms similar to those of the transaction manager 131.

Figure 31:
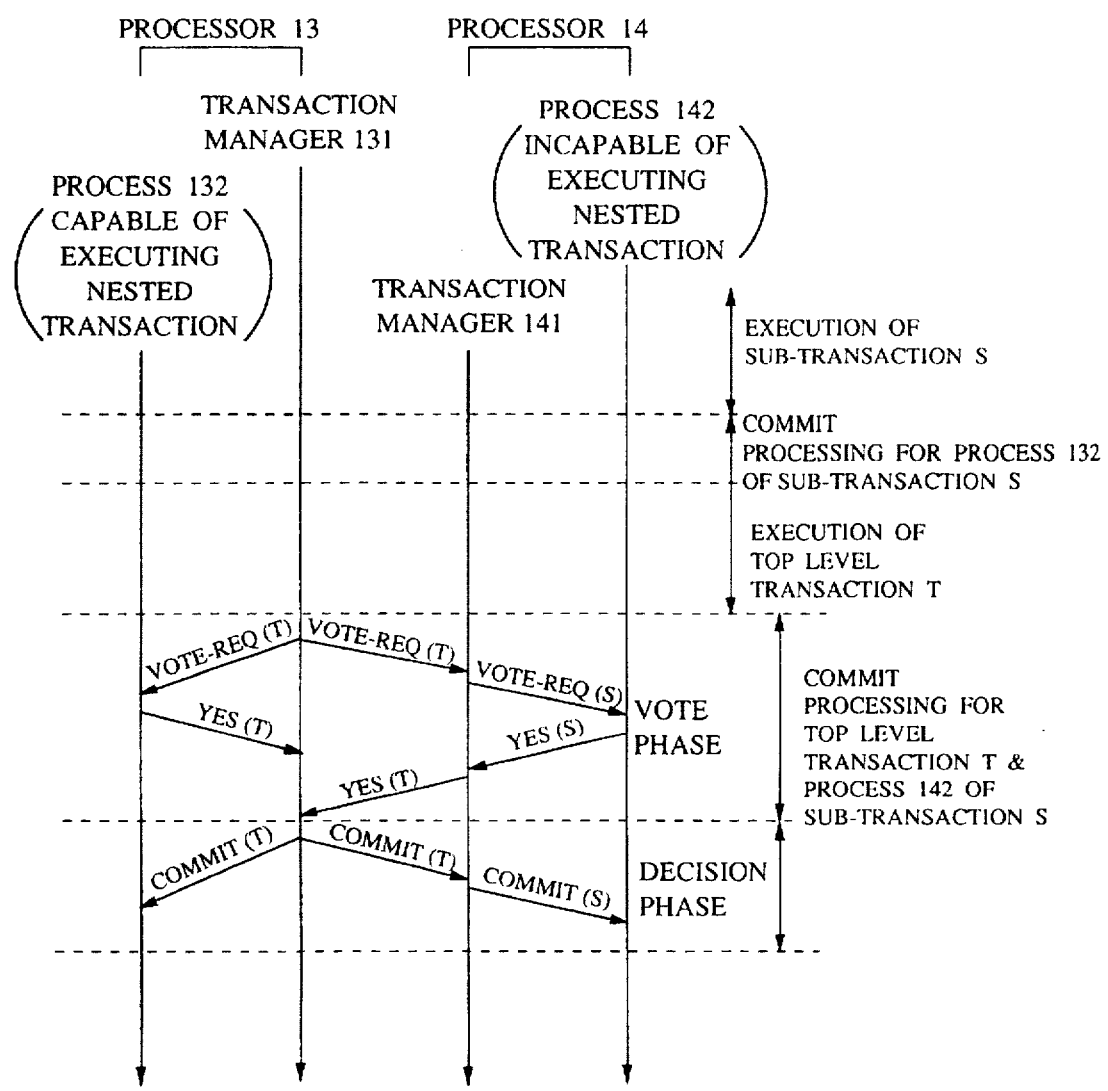
FIG. 31 is a timing chart for an exemplary operation of the transaction processing on the processor of FIG. 29 in a first embodiment of a transaction processing system according to the present invention, in a case of commitment.

Now, in this case, the transaction manager 131 carries out the commit processing according to the timing chart of FIG. 31 as follows.

Namely, when the execution of the sub-transaction S is completed, the commit processing for the sub-transaction S is carried out by the transaction manager 131, only for the processes of the sub-transaction S which are capable of executing the nested transaction such as the process-1 132, while not carrying out the commit processing for the processes of the sub-transaction S which are incapable of executing the nested transaction such as the process-2 133.

Figure 28:
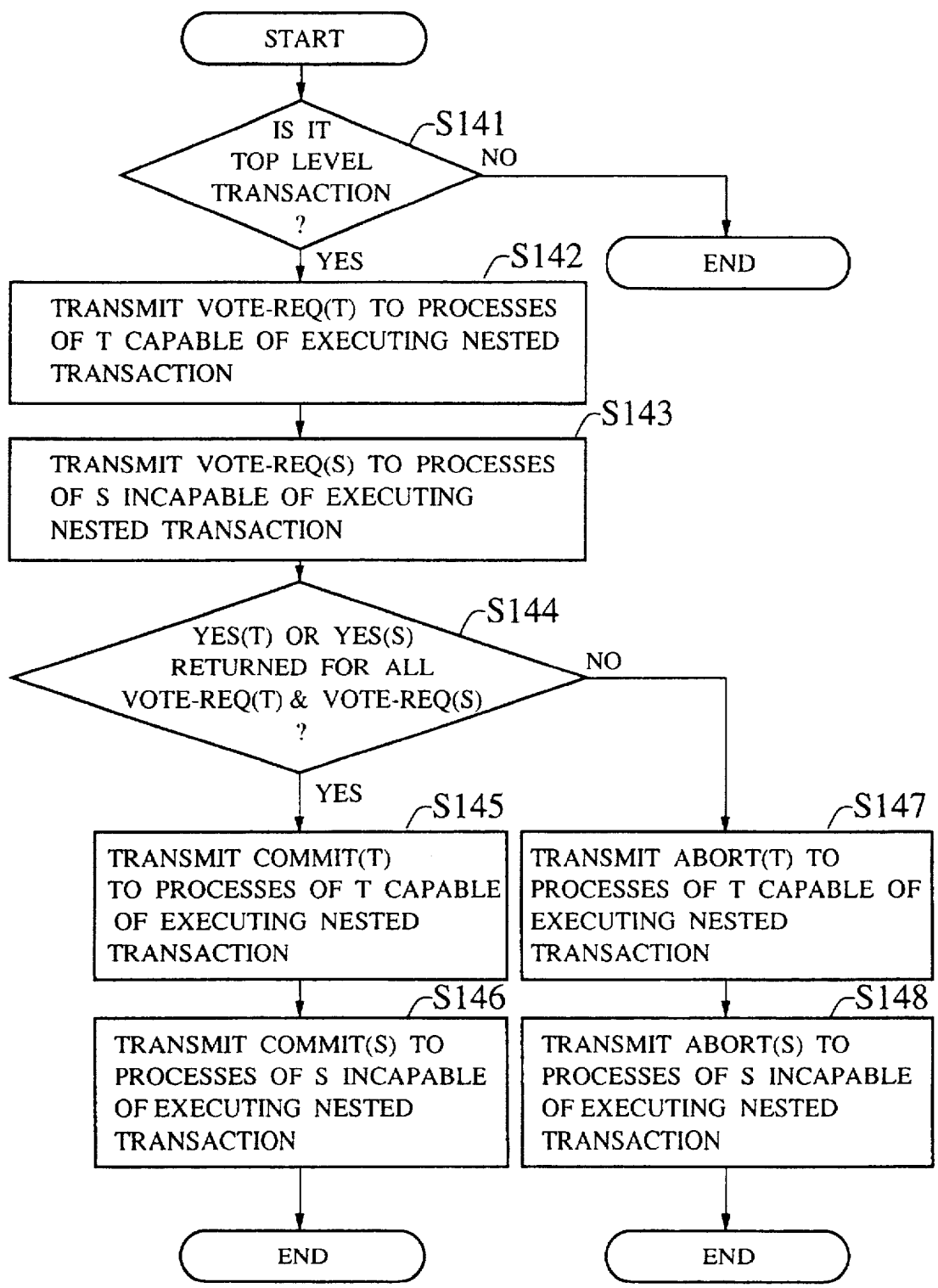
FIG. 28 is a flow chart of an operation for a commit processing in the transaction manager on the processor of FIG. 25 in a first embodiment of a transaction processing system according to the present invention.

Then, after the execution of the top level transaction T is completed, the transaction manager 131 carries out the commit processing for the top level transaction T, along with the commit processing for the processes of the sub-transaction S which are incapable of executing the nested transaction such as the process-2 142, according to the flow chart of FIG. 28 described above.

Here, the transaction manager 131 can realize the fact that the sub-transaction S is also distributed to the processor 14 from the transaction table 1312, so that instead of carrying out the commit processing for the process-2 142 which is incapable of executing the nested transaction directly, the transaction manager 131 notifies the transaction manager 141 on the processor 14 to carry out the commit processing for the top level transaction T through the communication connection 15. In response, the transaction manager 141 carries out the commit processing for the process-2 142 which is incapable of executing the nested transaction, according to the process table 1411 and the transaction table 1412, and returns the result of this commit processing for the process-2 142 as the result of the commit processing for the top level transaction to the transaction manager 131 through the communication connection 15.

It is to be noted that the commit processing procedure of the first embodiment described above is equally applicable to a case of realizing the transaction manager as an independent process and to a case of realizing the transaction manager as a library which is linked to a process for the transaction processing.

It is also to be noted that the commit processing procedure of the first embodiment described above is also applicable to a commit processing protocol other than the two-phase commit protocol such as a three-phase commit protocol which also includes the vote phase and the decision phase.

Figure 32:
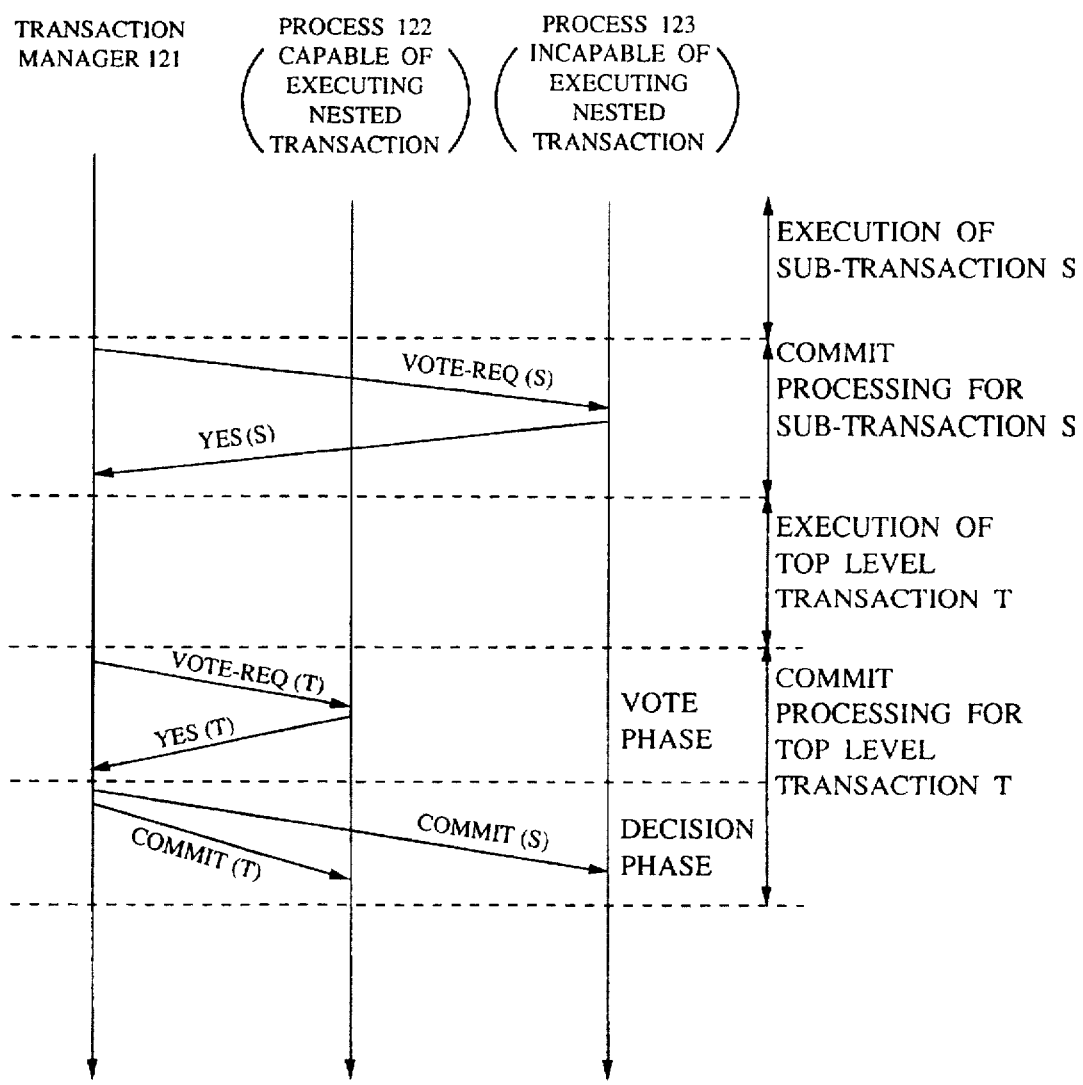
FIG. 32 is a timing chart for an exemplary operation of the transaction processing on the processor of FIG. 25 in a second embodiment of a transaction processing system according to the present invention, in a case of commitment.
Figure 33:
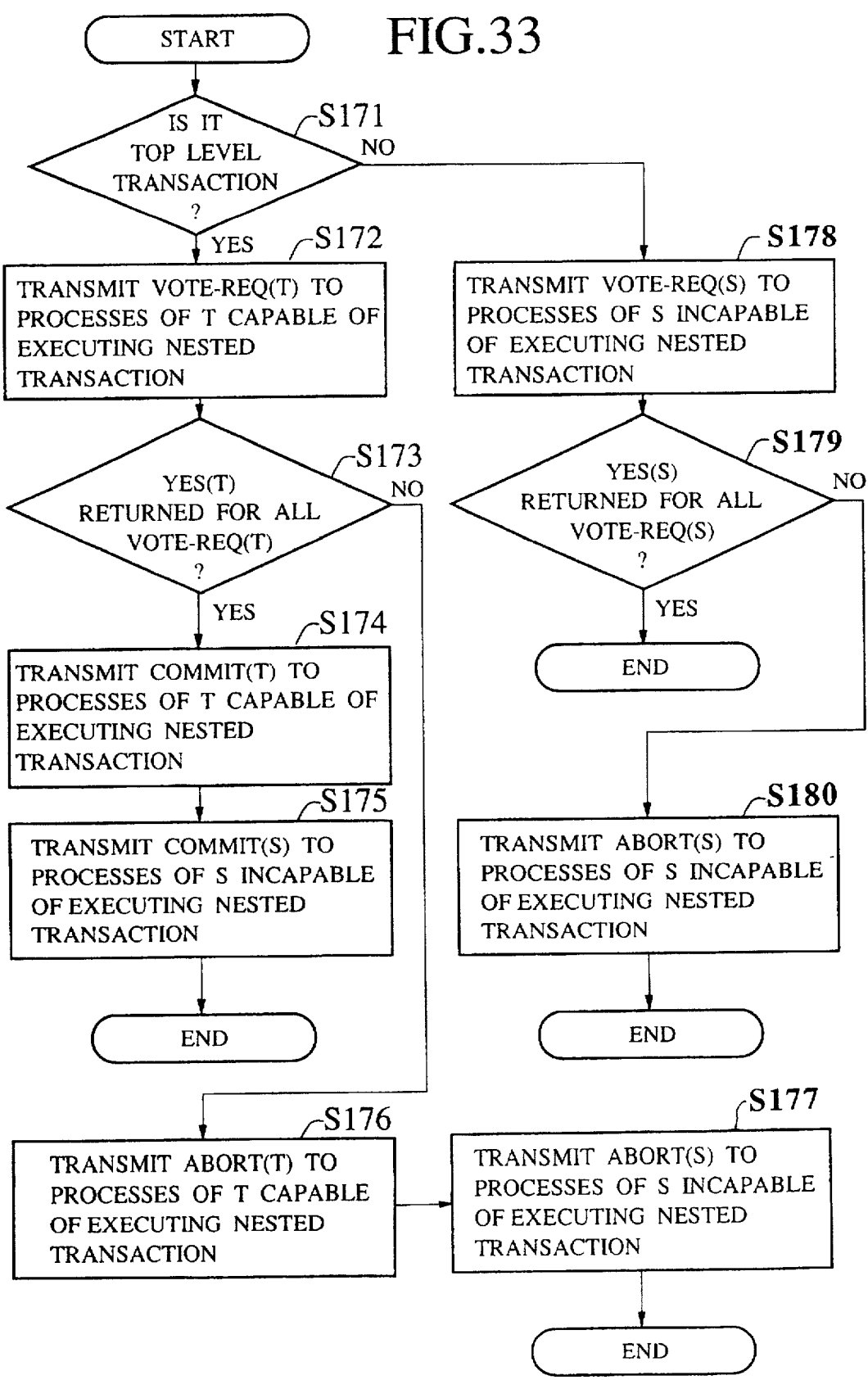
FIG. 33 is a flow chart of an operation for a commit processing in a transaction manager on the processor of FIG. 25 in a second embodiment of a transaction processing system according to the present invention.

Referring now to FIGS. 32 and 33, a second embodiment of a transaction processing system according to the present invention, which can be utilized in the distributed processing system of the present invention described above, will be described in detail.

This second embodiment also concerns with a case similar to that of the first embodiment described above, in which the nested transaction formed by a top level transaction T and its sub-transaction S is to be managed on the processor 12 shown in FIG. 25, in which the transaction manager 121 has the process table 1211 and the transaction table 1212 as shown in FIG. 26.

Here, however, in this second embodiment, the transaction manager 121 carries out the commit processing according to the timing chart of FIG. 32 as follows.

Namely, when the execution of the sub-transaction S is completed, the transaction manager 121 carries out the vote phase of the commit processing for the processes of the sub-transaction S which are incapable of executing the nested transaction, concurrently with the commit processing for the processes of the sub-transaction S which are capable of executing the nested transaction, while not carrying out the decision phase of the commit processing for the processes of the sub-transaction S which are incapable of executing the nested transaction.

Then, after the execution of the top level transaction T is completed, the transaction manager 121 carries out the commit processing for the top level transaction T, where the decision phase of the commit processing for the processes of the sub-transaction S which are incapable of executing the nested transaction is also carried out, concurrently with the decision phase of the commit processing for the top level transaction T, according to the flow chart of FIG. 33 as follows.

First, at the step S171, whether it is the top level transaction or not is determined.

Then, in a case it is the top level transaction, i.e., a case of the commit processing for the top level transaction T, next at the step S172, a vote request VOTE-REQ(T) for the top level transaction T is transmitted to all the processes which are related to the top level transaction T and capable of executing the nested transaction, which in this case include the process-1 122.

Then, next at the step S173, whether the replies YES(T) are received from all the processes to which the vote requests VOTE-REQ(T) have been transmitted or not is determined.

When the replies YES(T) are received from all the processes to which the vote requests VOTE-REQ(T) have been transmitted, as shown in the timing chart of FIG. 32, the vote phase is finished and the commit processing proceeds to the following decision phase next.

Namely, in this case, in the decision phase, first at the step S174, a commit request COMMIT(T) for the top level transaction T is transmitted to all the processes which are related to the top level transaction T and capable of executing the nested transaction, which in this case include the process-1 122.

Then, next at the step S175, a commit request COMMIT(S) for the processes of the sub-transaction S which are incapable of executing the nested transaction is transmitted to all the processes which are related to any one of the sub-transaction S of the top level transaction T and incapable of executing the nested transaction, which in this case include the process-2 123, and the process is terminated.

On the other hand, when at least one reply NO(T) is received from any one of the processes to which the vote requests VOTE-REQ(T) have been transmitted, the vote phase is finished and the commit processing proceeds to the following decision phase next.

Namely, in this case, in the decision phase, at the step S176, an abort request ABORT(T) for the top level transaction T is transmitted to all the processes which are related to the top level transaction T and capable of executing the nested transaction, which in this case include the process-1 122.

Then, next at the step S177, an abort request ABORT(S) for the processes of the sub-transaction S which are incapable of executing the nested transaction is transmitted to all the processes which are related to any one of the sub-transaction S of the top level transaction T and incapable of executing the nested transaction, which in this case include the process-2 123, and the process is terminated.

Meanwhile, when it is not the top level transaction at the step S171, i.e., a case of the commit processing for the processes of the sub-transaction S which are incapable of executing the nested transaction, next at the step S178, a vote request VOTE-REQ(S) for the processes of the sub-transaction S which are incapable of executing the nested transaction is transmitted to all the processes which are related to any one of the sub-transaction S of the top level transaction T and incapable of executing the nested transaction, which in this case include the process-2 123, during with the commit processing for the processes of the sub-transaction S which are capable of executing the nested transaction.

Then, next at the step S179, whether the replies YES(S) are received from all the processes to which the vote requests VOTE-REQ(S) have been transmitted or not is determined.

When the replies YES(S) are received from all the processes to which the vote requests VOTE-REQ(S) have been transmitted, as shown in the timing chart of FIG. 32, the process is terminated.

On the other hand, when at least one reply NO(S) is received from any one of the processes to which the vote requests VOTE-REQ(S) have been transmitted, the vote phase is finished and the commit processing proceeds to the following decision phase next.

Namely, in this case, in the decision phase, at the step S180, an abort request ABORT(S) for the processes of the sub-transaction S which are incapable of executing the nested transaction is transmitted to all the processes which are related to any sub-transaction S of the top level transaction T and incapable of executing the nested transaction, which in this case include the process-2 123, and the process is terminated.

In this manner, the commit processing for the entire transaction family can be completed.

It is to be noted that this commit processing procedure of the second embodiment is equally valid as that of the first embodiment described above, because it suffices for the vote phase of the commit processing for the process of the sub-transaction S which are incapable of executing the nested transaction to be completed any time before the decision phase of the commit processing for the top level transaction T starts.

Now, the commit processing procedure similar to that of the second embodiment above is also applicable to a case of managing the nested transaction formed by a top level transaction T and its sub-transaction S on a configuration shown in FIG. 29.

Figure 34:
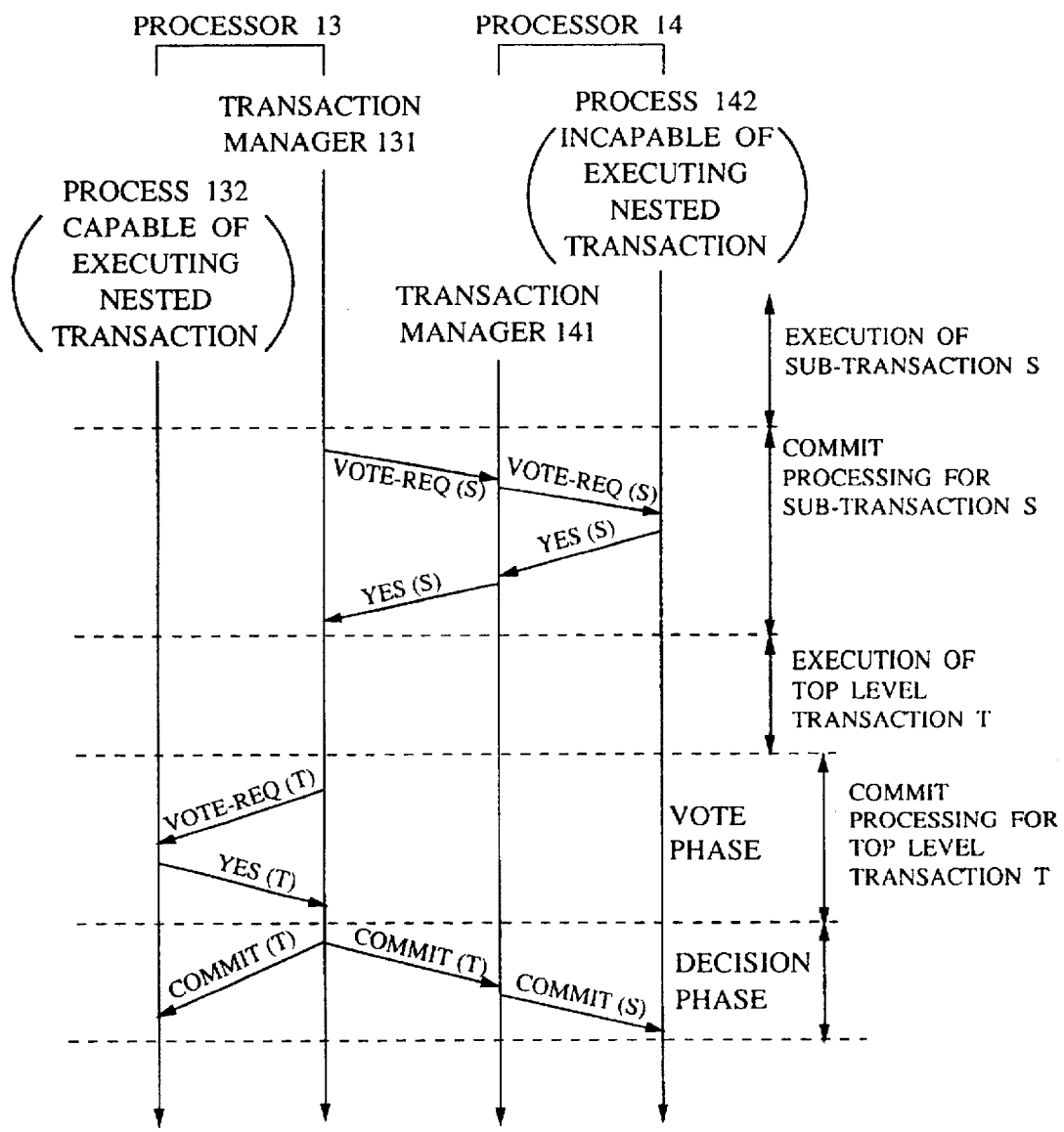
FIG. 34 is a timing chart for an exemplary operation of the transaction processing on the processor of FIG. 29 in a second embodiment of a transaction processing system according to the present invention, in a case of commitment.

In this case, the transaction manager 131 carries out the commit processing according to the timing chart of FIG. 34 as follows.

Namely, when the execution of the sub-transaction S is completed, the transaction manager 131 carries out the vote phase of the commit processing for the processes of the sub-transaction S which are incapable of executing the nested transaction through the transaction manager 141, concurrently with the commit processing for the processes of the sub-transaction S which are capable of executing the nested transaction, while not carrying out the decision phase of the commit processing for the processes of the sub-transaction S which are incapable of executing the nested transaction.

Then, after the execution of the top level transaction T is completed, the transaction manager 131 carries out the commit processing for the top level transaction T, where the decision phase of the commit processing for the processes of the sub-transaction S which are incapable of executing the nested transaction is also carried out through the transaction manager 141, concurrently with the decision phase of the commit processing for the top level transaction T, according to the flow chart of FIG. 33 described above.

Here, the transaction manager 131 can realize the fact that the sub-transaction S is also distributed to the processor 14 from the transaction table 1312. Consequently, at a timing of the commit processing for the sub-transaction S, instead of carrying out the commit processing for the process-2 142 which is incapable of executing the nested transaction directly, the transaction manager 131 notifies the transaction manager 141 on the processor 14 to carry out the vote phase of the commit processing for the process 142 of the sub-transaction S which is incapable of executing the nested transaction, through the communication connection 15. In response, the transaction manager 141 carries out the vote phase of the commit processing for the process-2 142 which is incapable of executing the nested transaction, according to the process table 1411 and the transaction table 1412, and returns the result of this vote phase of the commit processing for the process-2 142 to the transaction manager 131 through the communication connection 15.

Then, at a timing of the commit processing for the top level transaction T, instead of carrying out the decision phase of the commit processing for the process-2 142 which is incapable of executing the nested transaction directly, the transaction manager 131 notifies the transaction manager 141 on the processor 14 to carry out the commit processing for the top level transaction T through the communication connection 15. In response, the transaction manager 141 carries out the commit processing for the process-2 142 which is incapable of executing the nested transaction, according to the process table 1411 and the transaction table 1412.

Figure 35:
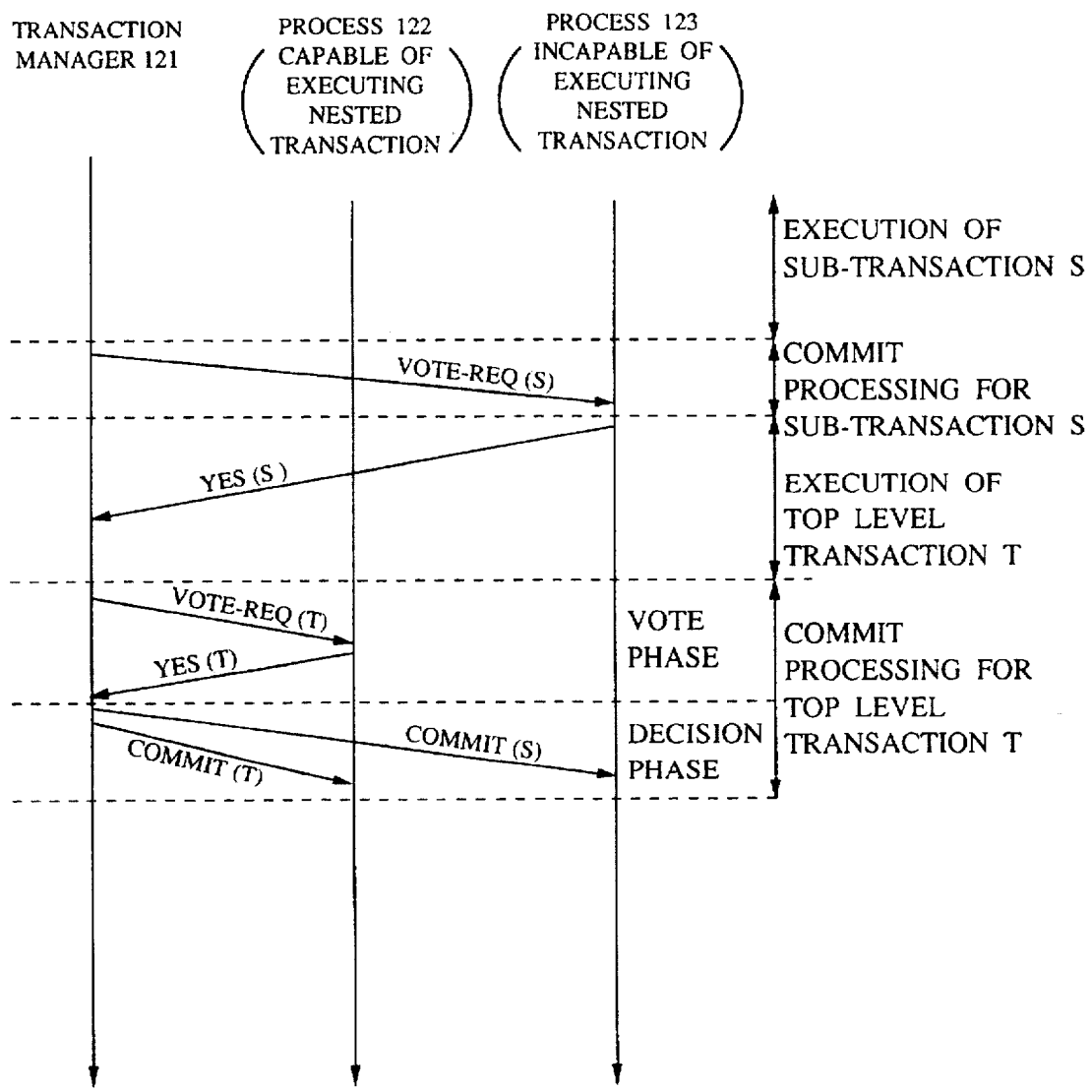
FIG. 35 is a timing chart for an exemplary operation of the transaction processing on the processor of FIG. 25 in a third embodiment of a transaction processing system according to the present invention, in a case of commitment.
Figure 36:
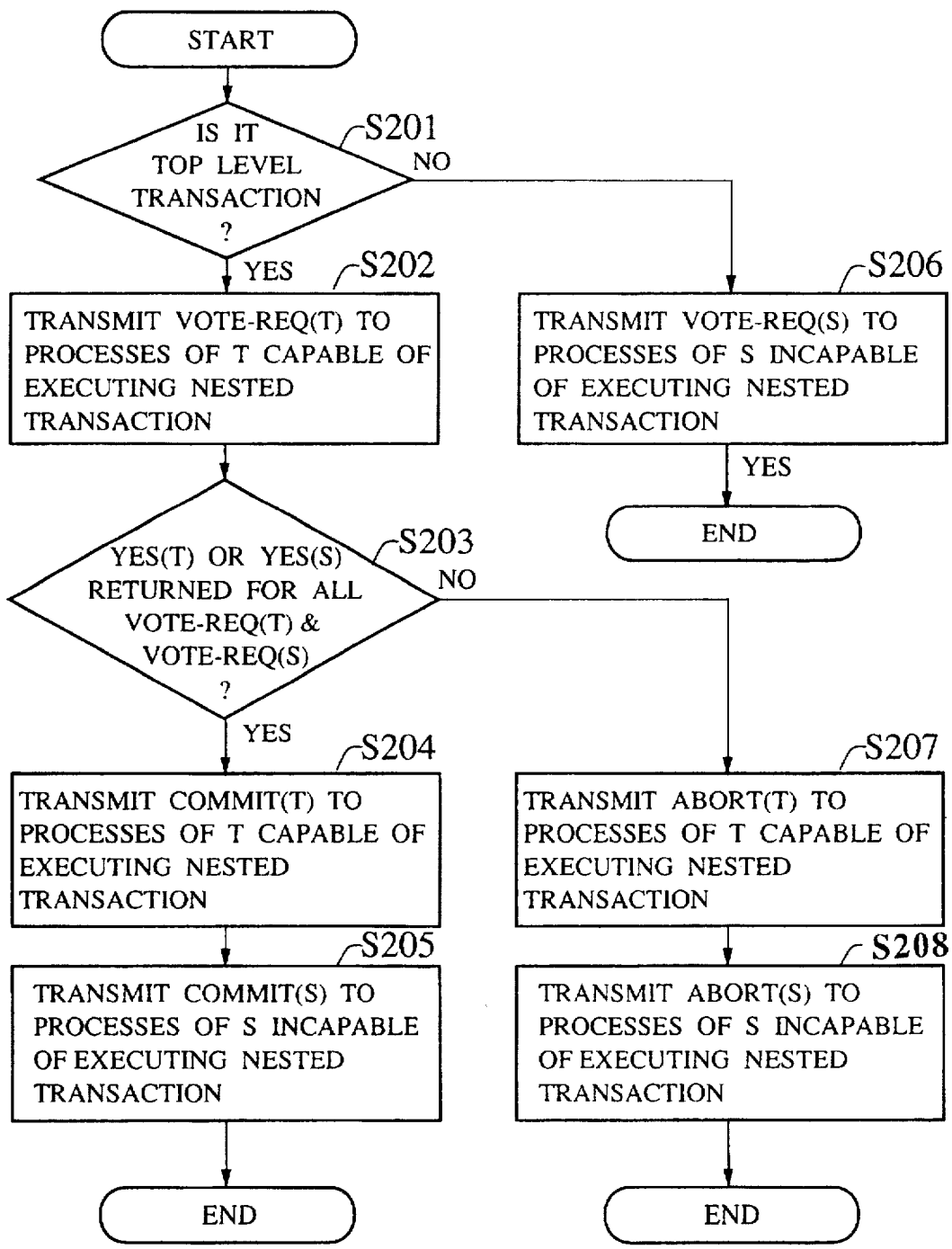
FIG. 36 is a flow chart of an operation for a commit processing in a transaction manager on the processor of FIG. 25 in a third embodiment of a transaction processing system according to the present invention.

Referring now to FIGS. 35 and 36, a third embodiment of a transaction processing system according to the present invention, which can be utilized in the distributed processing system of the present invention described above, will be described in detail.

This third embodiment also concerns with a case similar to that of the first embodiment described above, in which the nested transaction formed by a top level transaction T and its sub-transaction S is to be managed on the processor 12 shown in FIG. 25, in which the transaction manager 121 has the process table 1211 and the transaction table 1212 as shown in FIG. 26.

Here, however, in this third embodiment, the transaction manager 121 carries out the commit processing according to the timing chart of FIG. 35 as follows.

Namely, when the execution of the sub-transaction S is completed, the transaction manager 121 carries out the commit processing for the processes of the sub-transaction S which are capable of executing the nested transaction. At the same time, the transaction manager 121 transmits the vote request VOTE-REQ(S) to the processes of the sub-transaction S which are incapable of executing the nested transaction. In other words, a first part of the vote phase of the commit processing for the processes of the sub-transaction S which are incapable of executing the nested transaction is carried out concurrently with the commit processing for the processes of the sub-transaction S which are capable of executing the nested transaction.

Then, during the execution of the top level transaction T, the reply for the VOTE-REQ(S) is returned from the processes of the sub-transaction S which are incapable of executing the nested transaction to the transaction manager 121.

Then, after the execution of the top level transaction T is completed, the transaction manager 121 carries out the commit processing for the top level transaction T, where the decision phase of the commit processing for the processes of the sub-transaction S which are incapable of executing the nested transaction is carried out concurrently with the decision phase of the commit processing for the top level transaction T, according to the flow chart of FIG. 36 as follows.

First, at the step S201, whether it is the top level transaction or not is determined.

Then, in a case it is the top level transaction, i.e., a case of the commit processing for the top level transaction T, next at the step S202, a vote request VOTE-REQ(T) for the top level transaction T is transmitted to all the processes which are related to the top level transaction T and capable of executing the nested transaction, which in this case include the process-1 122.

Then, next at the step S203, whether the replies YES(T) or YES(S) are received from all the processes to which the vote requests VOTE-REQ(T) and VOTE-REQ(S) have been transmitted or not is determined.

When the replies YES(T) or YES(S) are received from all the processes to which the vote requests VOTE-REQ(T) and VOTE-REQ(S) have been transmitted, as shown in the timing chart of FIG. 35, the vote phase is finished and the commit processing proceeds to the following decision phase next.

Namely, in this case, in the decision phase, first at the step S204, a commit request COMMIT(T) for the top level transaction T is transmitted to all the processes which are related to the top level transaction T and capable of executing the nested transaction, which in this case include the process-1 122.

Then, next at the step S205, a commit request COMMIT (S) for the processes of the sub-transaction S which are incapable of executing the nested transaction is transmitted to all the processes which are related to any one of the sub-transaction S of the top level transaction T and incapable of executing the nested transaction, which in this case include the process-2 123, and the process is terminated.

On the other hand, when at least one reply NO(T) or NO(S) is received from any one of the processes to which the vote requests VOTE-REQ(T) and VOTE-REQ(S) have been transmitted, the vote phase is finished and the commit processing proceeds to the following decision phase next.

Namely, in this case, in the decision phase, first at the step S207, an abort request ABORT(T) for the top level transaction T is transmitted to all the processes which are related to the top level transaction T and capable of executing the nested transaction, which in this case include the process-1 122.

Then, next at the step S208, an abort request ABORT(S) for the processes of the sub-transaction S which are incapable of executing the nested transaction is transmitted to all the processes which are related to any sub-transaction S of the top level transaction T and incapable of executing the nested transaction, which in this case include the process-2 123, and the process is terminated.

Meanwhile, when it is not the top level transaction at the step S201, i.e., a case of the commit processing for the processes of the sub-transaction S which are incapable of executing the nested transaction, next at the step S206, a vote request VOTE-REQ(S) for the processes of the sub-transaction S which are incapable of executing the nested transaction is transmitted to all the processes which are related to any one of the sub-transaction S of the top level transaction T and incapable of executing the nested transaction, which in this case include the process-2 123, and the process is terminated.

In this manner, the commit processing for the entire transaction family can be completed.

It is to be noted that this commit processing procedure of the third embodiment is equally valid as that of the first embodiment described above, because it suffices for the vote phase of the commit processing for the process of the sub-transaction S which are incapable of executing the nested transaction to be completed any time before the decision phase of the commit processing for the top level transaction T starts.

Now, the commit processing procedure similar to that of the third embodiment above is also applicable to a case of managing the nested transaction formed by a top level transaction T and its sub-transaction S on a configuration shown in FIG. 29.

Figure 37:
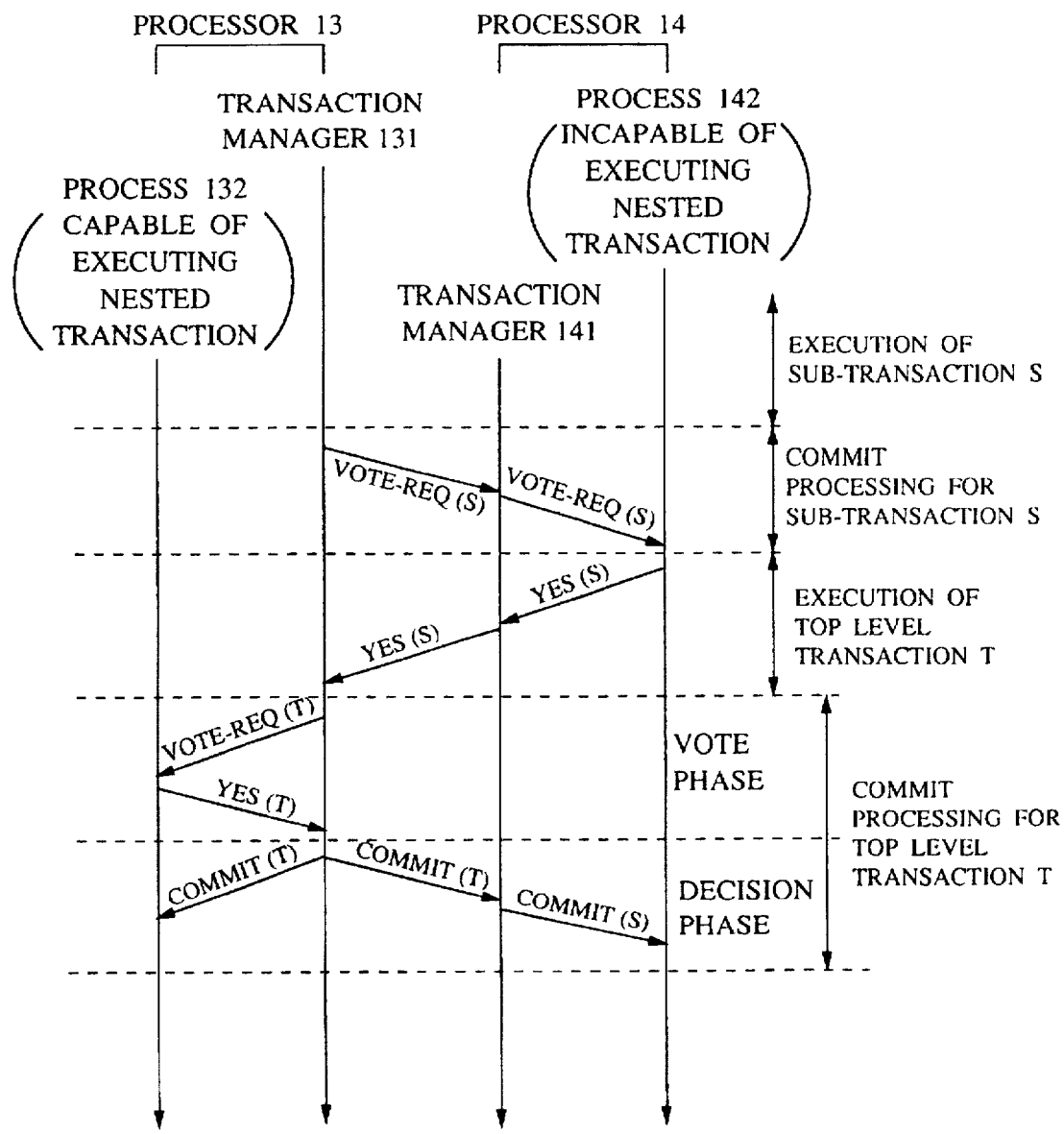
FIG. 37 is a timing chart for an exemplary operation of the transaction processing on the processor of FIG. 29 in a third embodiment of a transaction processing system according to the present invention, in a case of commitment.

In this case, the transaction manager 131 carries out the commit processing according to the timing chart of FIG. 37 as follows.

Namely, when the execution of the sub-transaction S is completed, the transaction manager 131 carries out the commit processing for the processes of the sub-transaction S which are capable of executing the nested transaction. At the same time, the transaction manager 131 transmits the vote request VOTE-REQ(S) to the processes of the sub-transaction S which are incapable of executing the nested transaction, through the transaction manager 141. In other words, a first part of the vote phase of the commit processing for the processes of the sub-transaction S which are incapable of executing the nested transaction is carried out concurrently with the commit processing for the processes of the sub-transaction S which are capable of executing the nested transaction.

Then, during the execution of the top level transaction T, the reply for the VOTE-REQ(S) is returned from the processes of the sub-transaction S which are incapable of executing the nested transaction to the transaction manager 131 through the transaction manager 141.

Then, after the execution of the top level transaction T is completed, the transaction manager 131 carries out the commit processing for the top level transaction T, where the decision phase of the commit processing for the processes of the sub-transaction S which are incapable of executing the nested transaction is carried out through the transaction manager 141, concurrently with the decision phase of the commit processing for the top level transaction T, according to the flow chart of FIG. 36 described above.

Here, the transaction manager 131 can realize the fact that the sub-transaction S is also distributed to the processor 14 from the transaction table 1312. Consequently, at a timing of the commit processing for the sub-transaction S, instead of carrying out the commit processing for the process-2 142 which is incapable of executing the nested transaction directly, the transaction manager 131 notifies the transaction manager 141 on the processor 14 to carry out the vote phase of the commit processing for the process 142 of the sub-transaction S which is incapable of executing the nested transaction, through the communication connection 15. In response, the transaction manager 141 carries out the vote phase of the commit processing for the process-2 142 which is incapable of executing the nested transaction, according to the process table 1411 and the transaction table 1412, and then returns the result of this vote phase of the commit processing for the process-2 142 to the transaction manager 131 through the communication connection 15 during the execution of the top level transaction T.

Then, at a timing of the commit processing for the top level transaction T, instead of carrying out the decision phase of the commit processing for the process-2 142 which is incapable of executing the nested transaction directly, the transaction manager 131 notifies the transaction manager 141 on the processor 14 to carry out the commit processing for the top level transaction T through the communication connection 15. In response, the transaction manager 141 carries out the commit processing for the process-2 142 which is incapable of executing the nested transaction, according to the process table 1411 and the transaction table 1412.

Figure 38:
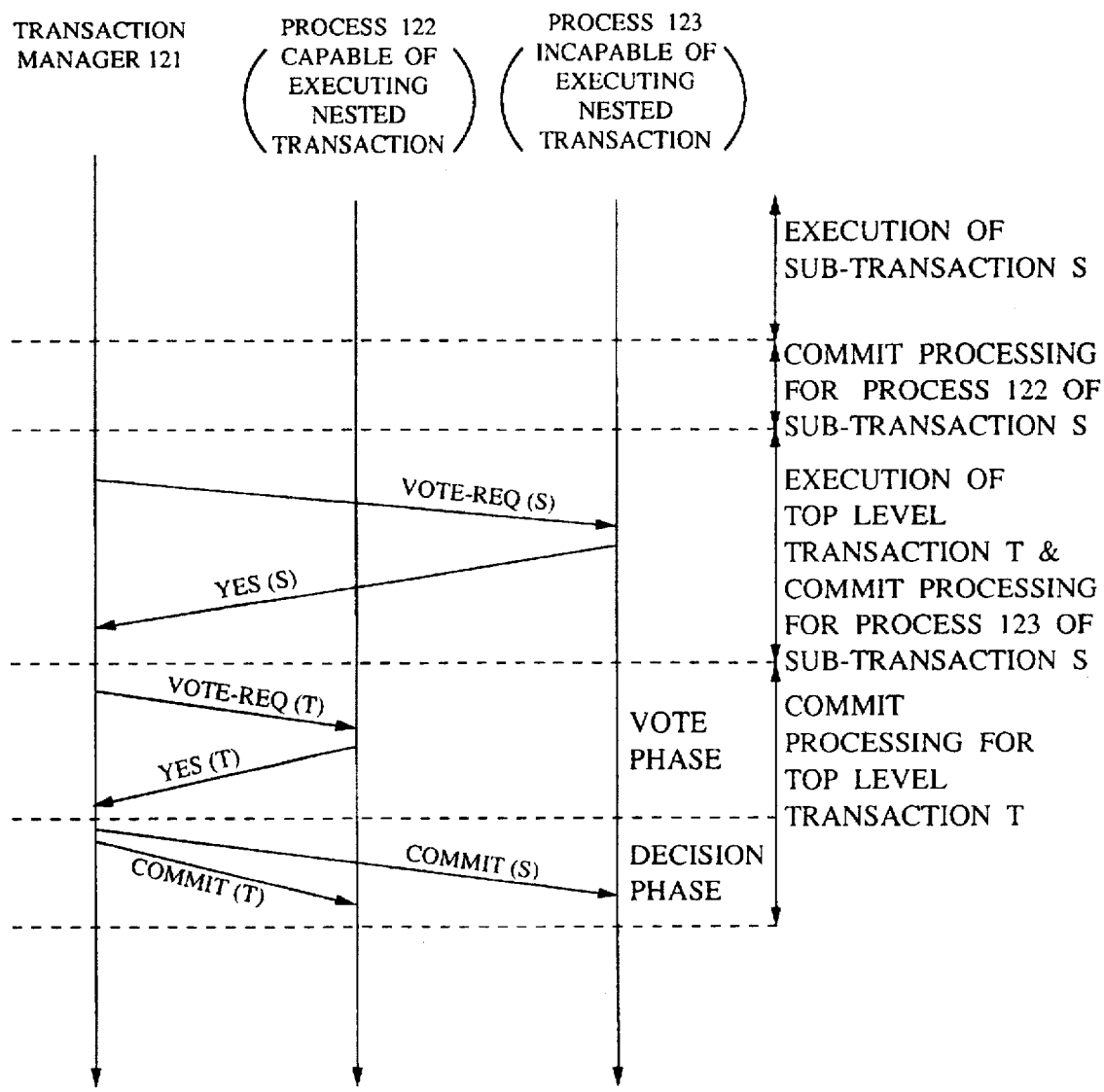
FIG. 38 is a timing chart for an exemplary operation of the transaction processing on the processor of FIG. 25 in a fourth embodiment of a transaction processing system according to the present invention, in a case of commitment.
Figure 39:
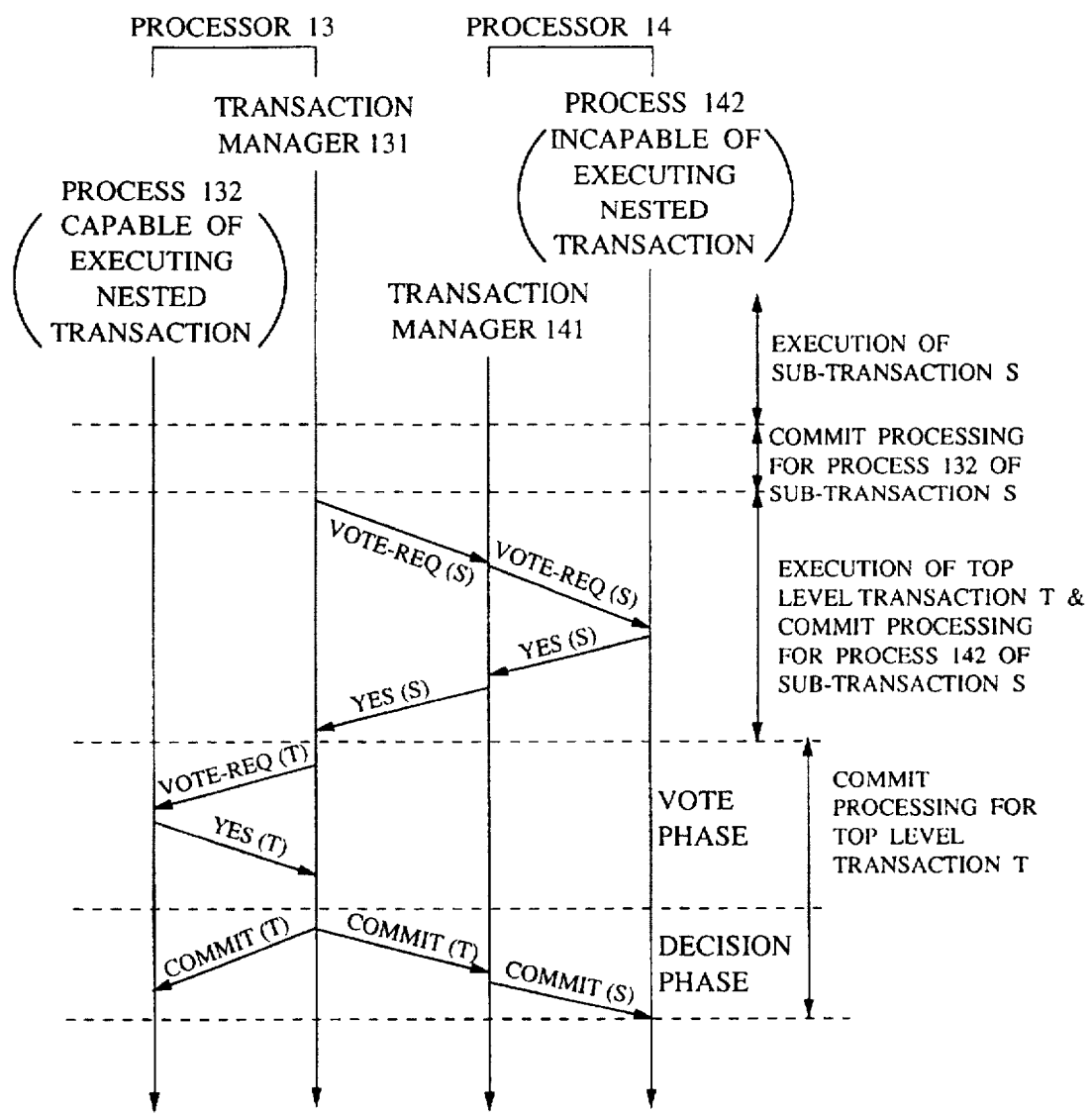
FIG. 39 is a timing chart for an exemplary operation of the transaction processing on the processor of FIG. 29 in a fourth embodiment of a transaction processing system according to the present invention, in a case of commitment.

Referring now to FIGS. 38 and 39, a fourth embodiment of a transaction processing system according to the present invention, which can be utilized in the distributed processing system of the present invention described above, will be described in detail.

This fourth embodiment also concerns with a case similar to that of the first embodiment described above, in which the nested transaction formed by a top level transaction T and its sub-transaction S is to be managed on the processor 12 shown in FIG. 25, in which the transaction manager 121 has the process table 1211 and the transaction table 1212 as shown in FIG. 26.

Here, however, in this fourth embodiment, the transaction manager 121 carries out the commit processing according to the timing chart of FIG. 38 as follows.

Namely, when the execution of the sub-transaction S is completed, the transaction manager 121 carries out the commit processing for the processes of the sub-transaction S which are capable of executing the nested transaction, while not carrying out the commit processing for the processes of the sub-transaction S which are incapable of executing the nested transaction.

Then, during the execution of the top level transaction T, the transaction manager 121 carries out the vote phase of the commit processing for the processes of the sub-transaction S which are incapable of executing the nested transaction.

Then, after the execution of the top level transaction T is completed, the transaction manager 121 carries out the commit processing for the top level transaction T, where the decision phase of the commit processing for the processes of the sub-transaction S which are incapable of executing the nested transaction is also carried out, concurrently with the decision phase of the commit processing for the top level transaction T, just as in the third embodiment described above.

It is to be noted that this commit processing procedure of the fourth embodiment is equally valid as that of the first embodiment described above, because it suffices for the vote phase of the commit processing for the process of the sub-transaction S which are incapable of executing the nested transaction to be completed any time before the decision phase of the commit processing for the top level transaction T starts.

Now, the commit processing procedure similar to that of the fourth embodiment above is also applicable to a case of managing the nested transaction formed by a top level transaction T and its sub-transaction S on a configuration shown in FIG. 29.

In this case, the transaction manager 131 carries out the commit processing according to the timing chart of FIG. 39 as follows.

Namely, when the execution of the sub-transaction S is completed, the transaction manager 131 carries out the commit processing for the processes of the sub-transaction S which are capable of executing the nested transaction, while not carrying out the decision phase of the commit processing for the processes of the sub-transaction S which are incapable of executing the nested transaction.

Then, during the execution of the top level transaction T, the transaction manager 131 carries out the vote phase of the commit processing for the processes of the sub-transaction S which are incapable of executing the nested transaction, through the transaction manager 141.

Then, after the execution of the top level transaction T is completed, the transaction manager 131 carries out the commit processing for the top level transaction T, where the decision phase of the commit processing for the processes of the sub-transaction S which are incapable of executing the nested transaction is also carried out through the transaction manager 141, concurrently with the decision phase of the commit processing for the top level transaction T, just as in the third embodiment described above.

Here, the transaction manager 131 can realize the fact that the sub-transaction S is also distributed to the processor 14 from the transaction table 1312. Consequently, at a timing of the execution of the top level transaction T, instead of carrying out the commit processing for the process-2 142 which is incapable of executing the nested transaction directly, the transaction manager 131 notifies the transaction manager 141 on the processor 14 to carry out the vote phase of the commit processing for the process 142 of the sub-transaction S which is incapable of executing the nested transaction, through the communication connection 15. In response, the transaction manager 141 carries out the vote phase of the commit processing for the process-2 142 which is incapable of executing the nested transaction, according to the process table 1411 and the transaction table 1412, and returns the result of the vote phase of the commit processing for the process-2 142 to the transaction manager 131 through the communication connection 15 during the execution of the top level transaction T.

Then, at a timing of the commit processing for the top level transaction T, instead of carrying out the decision phase of the commit processing for the process-2 142 which is incapable of executing the nested transaction directly, the transaction manager 131 notifies the transaction manager 141 on the processor 14 to carry out the commit processing for the top level transaction T through the communication connection 15. In response, the transaction manager 141 carries out the commit processing for the process-2 142 which is incapable of executing the nested transaction, according to the process table 1411 and the transaction table 1412.

As described, in the first to fourth embodiments described above, the commit processing for the processes of the sub-transaction S which are incapable of executing the nested transaction is postponed until a timing for the commit processing for the top level transaction T. Moreover, at a timing for the commit processing for the top level transaction T, the commit for the entire transaction family is determined according to both of the commit for the top level transaction T as well as the commit for the processes of the sub-transaction S which are incapable of executing the nested transaction. As a result, it is possible in these first to fourth embodiments to carry out the commit processing for maintaining the atomicity, consistency, isolation, and durability in the entire transaction family, without requiring the rewriting of the program of the process which are incapable of executing the nested transaction.

Consequently, according to these first to fourth embodiments, it becomes possible to provide a transaction processing system suitable for dealing with a nested transaction, which is compatible with already existing process incapable of dealing with a nested transaction.

Figures 40, 41A, 41B:
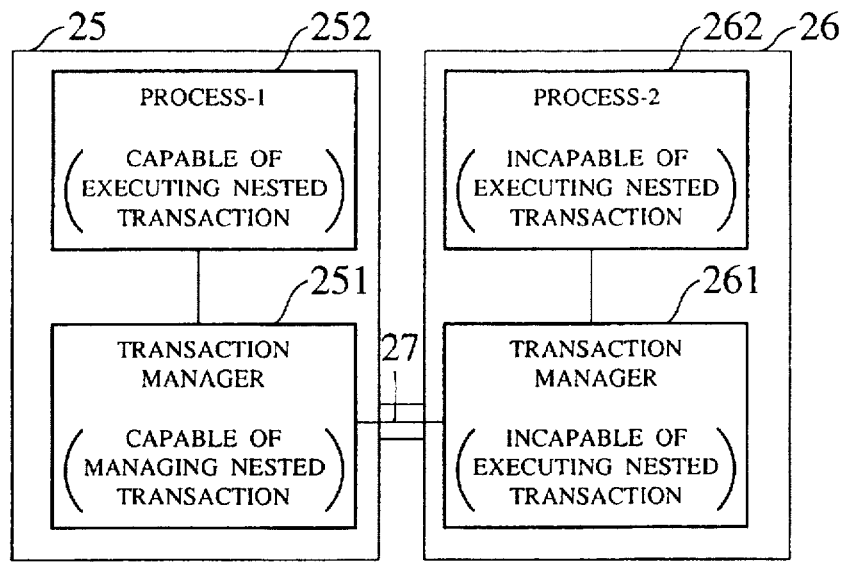
FIG. 40 is a schematic diagram of another exemplary configuration of a processor for a transaction processing system according to the present invention.
FIGS. 41A and 41B are diagrams illustrating tables used in two transaction managers on the processor of FIG. 40.

Referring now to FIG. 40, a fifth embodiment of a transaction processing system according to the present invention, which can be utilized in the distributed processing system of the present invention described above, will be described in detail.

This fifth embodiment concerns with a case of managing the nested transaction formed by a top level transaction T and its sub-transaction S on a configuration shown in FIG. 40, which includes: a processor 25 having a transaction manager 251 capable of managing the nested transaction and a process-1 252 capable of executing the nested transaction; and a processor 26 having a transaction manager 261 incapable of managing the nested transaction and a process-2 262 incapable of executing the nested transaction; where the transaction managers 251 and 261 can communicate with each other through a communication connection 27.

In this case, as shown in FIG. 41A, the transaction managers 251 has three tables of a process table 2511, a transaction table 2512, and a node table 2513. The process table 2511 enlists process numbers of the processes to be executed in the transaction processing on the processor 25 along with hierarchy flags indicating whether each of the processes to be executed in the transaction processing on the processor 25 is capable of executing the nested transaction or not. The transaction table 2512 enlists a transaction identifier such as T or S for each transaction to be executed, the transaction identifier of a parent transaction of each transaction, a state of each transaction indicating whether each transaction is in execution or committed, the process numbers of the processes to be executed in each transaction, and the node numbers indicating which other processor is this transaction related to. The node table 2513 enlists node numbers of the nodes to be used on the processor 25 along with hierarchy flags indicating whether each of the nodes to be used on the processor 25 is capable of executing the nested transaction or not.

On the other hand, as shown in FIG. 41B, the transaction manager 261 only has a transaction table 2612 in forms similar to the transaction table 2512 of the transaction manager 251.

Now, in this case, the transaction manager 251 carries out the commit processing according to the timing chart of FIG. 42 as follows.

Namely, when the execution of the sub-transaction S is completed, the commit processing for the sub-transaction S is carried out by the transaction manager 131, only for the processes of the sub-transaction S which are capable of executing the nested transaction such as the process-1 252, while not carrying out the commit processing for the processes of the sub-transaction S which are incapable of executing the nested transaction such as the process-2 262. At this point, the transaction manager 251 only records the commitment of the sub-transaction S in the transaction table 2512, without making any command with respect to the process-1 252 and the process-2 262, while the transaction manager 261 still manages the sub-transaction S as being in the execution.

Figure 43:
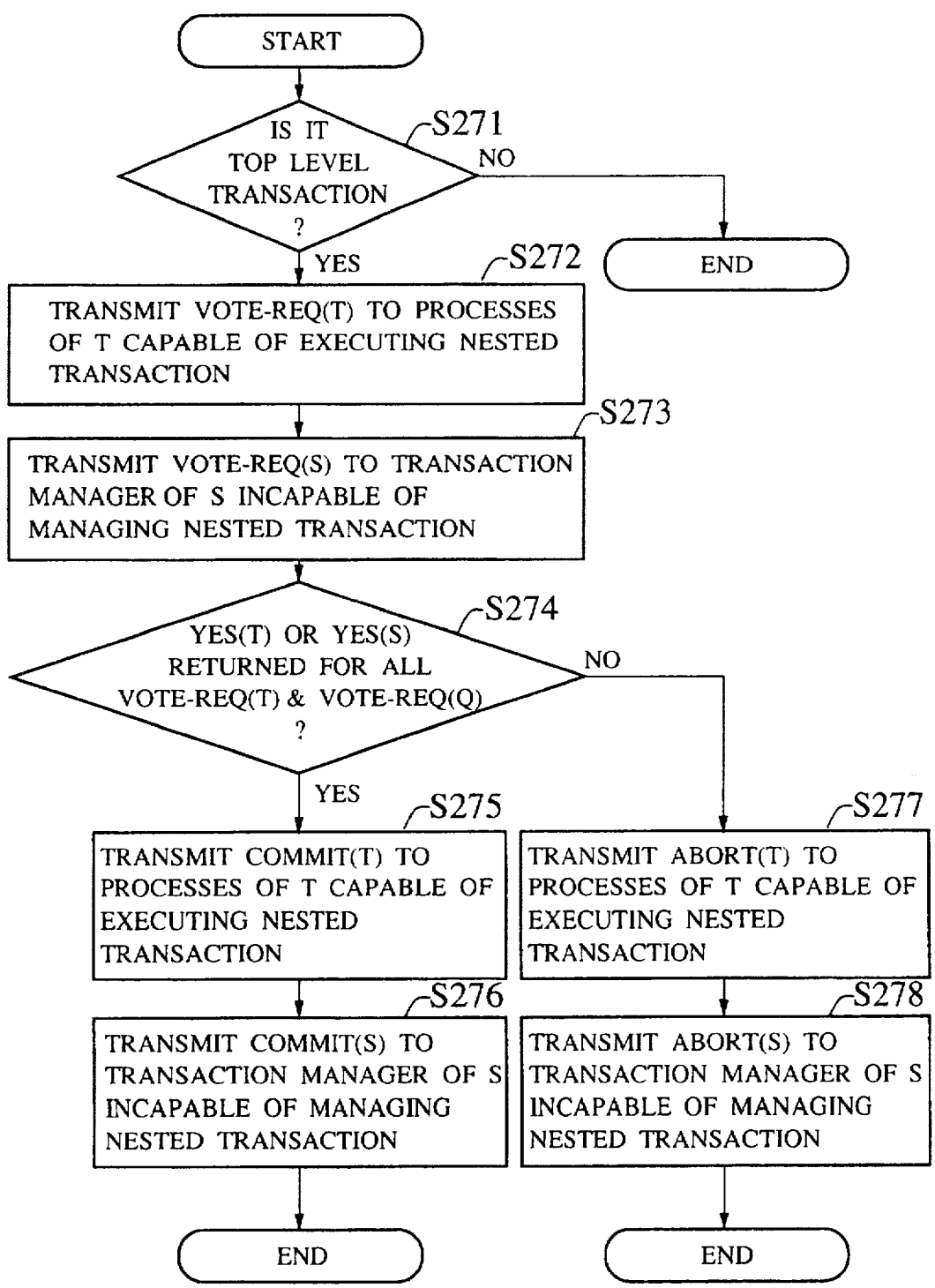
FIG. 43 is a flow chart of an operation for a commit processing in a transaction manager on the processor of FIG. 40 in a fifth embodiment of a transaction processing system according to the present invention.

Then, after the execution of the top level transaction T is completed, the transaction manager 251 carries out the commit processing for the top level transaction T, along with the commit processing for the processes of the sub-transaction S which are incapable of executing the nested transaction such as the process-2 262 through the transaction manager 261, according to the flow chart of FIG. 43 as follows.

First, at the step S271, whether it is the top level transaction or not is determined. When it is not the top level transaction, the process is terminated.

When it is the top level transaction, next at the step S272, a vote request VOTE-REQ(T) for the top level transaction T is transmitted to all the processes which are related to the top level transaction T and capable of executing the nested transaction, which in this case include the process-1 252.

Then, next at the step S273, as it is indicated in the node table 2513 that the sub-transaction S is distributed over the processor 26 having the transaction manager 261 incapable of managing the nested transaction, the transaction manager 251 transmits a vote request VOTE-REQ(S) for the processes of the sub-transaction S which are incapable of executing the nested transaction to all the transaction managers of the sub-transaction S which are related to any one of the sub-transaction S of the top level transaction T and incapable of managing the nested transaction, which in this case include the transaction manager 261. In response, the transaction manager 261 transmits the vote request VOTE-REQ(S) to the processes of the sub-transaction S which are incapable of executing the nested transaction such as the process-2 262, as it is indicated in the transaction table 2612 that the sub-transaction S is executed in the process-2 262. When the process-2 262 returns the reply YES(S) to the transaction manage 261, the transaction manager 261 in turn returns the reply YES(S) to the transaction manager 251.

Then, next at the step S274, whether the replies YES(T) or YES(S) are received for all of the transmitted vote requests VOTE-REQ(T) and VOTE-REQ(S) or not is determined.

Figure 42:
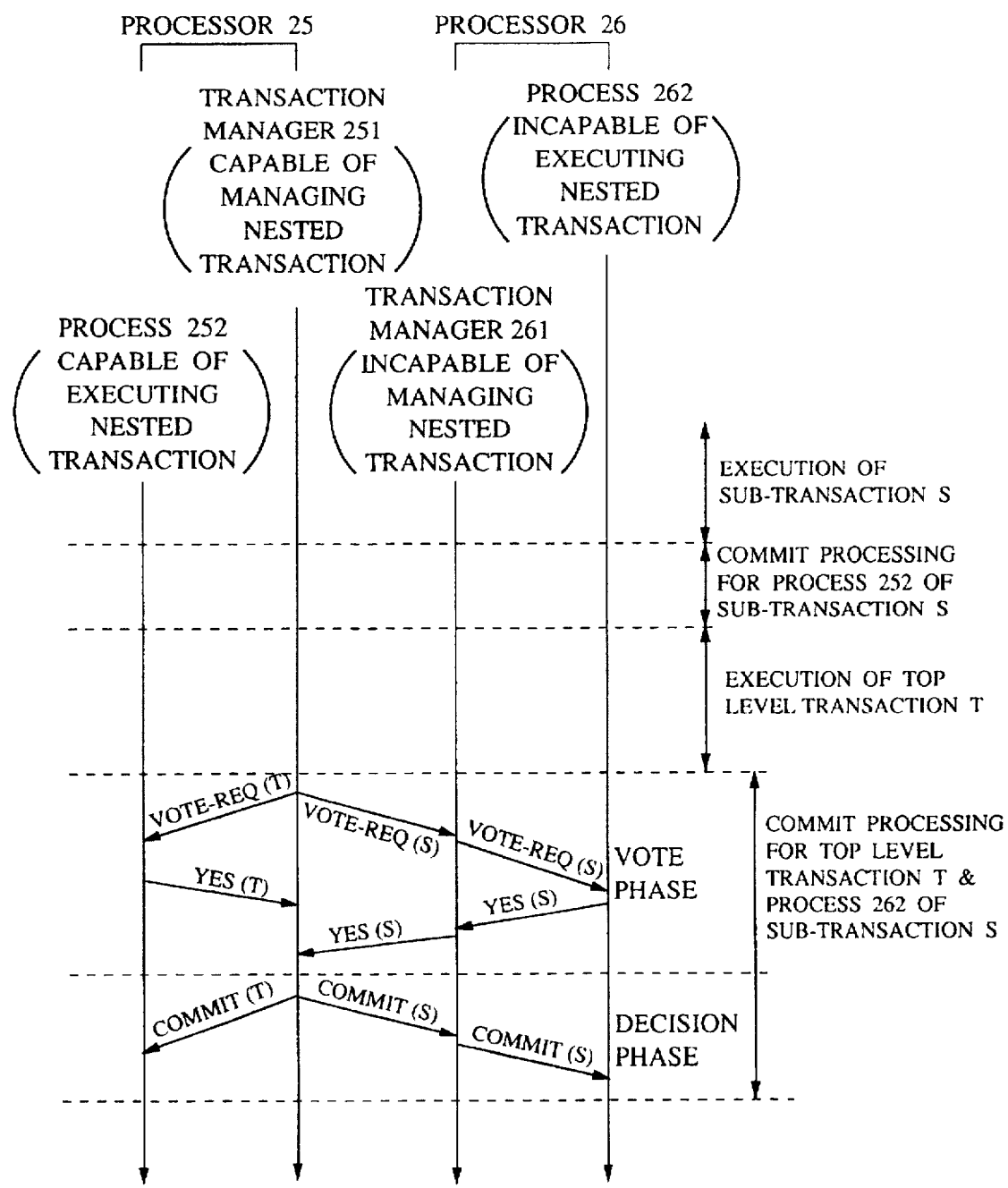
FIG. 42 is a timing chart for an exemplary operation of the transaction processing on the processor of FIG. 40 in a fifth embodiment of a transaction processing system according to the present invention, in a case of commitment.

When the replies YES(T) or YES(S) are received for all of the transmitted vote requests VOTE-REQ(T) and VOTE-REQ(S), as shown in the timing chart of FIG. 42, the vote phase is finished and the commit processing proceeds to the following decision phase next.

Namely, in this case, in the decision phase, first at the step S275, a commit request COMMIT(T) for the top level transaction T is transmitted to all the processes which are related to the top level transaction T and capable of executing the nested transaction, which in this case include the process-1 252.

Then, next at the step S276, a commit request COMMIT(S) for the processes of the sub-transaction S which are incapable of executing the nested transaction is transmitted to all the transaction managers of the sub-transaction S which are related to any one of the sub-transaction S of the top level transaction T and incapable of managing the nested transaction, which in this case include the transaction manager 261, and the process is terminated.

On the other hand, when at least one reply NO(T) or NO(S) is received for any one of the transmitted vote requests VOTE-REQ(T) and VOTE-REQ(S), the vote phase is finished and the commit processing proceeds to the following decision phase next.

Namely, in this case, in the decision phase, first at the step S277, an abort request ABORT(T) for the top level transaction T is transmitted to all the processes which are related to the top level transaction T and capable of executing the nested transaction, which in this case include the process-1 252.

Then, next at the step S278, an abort request ABORT(S) for the processes of the sub-transaction S which are incapable of executing the nested transaction is transmitted to all the transaction managers of the sub-transaction S which are related to any sub-transaction S of the top level transaction T and incapable of executing the nested transaction, which in this case include the transaction manager 261, and the process is terminated.

In this manner, the commit processing for the entire transaction family can be completed.

Figure 44:
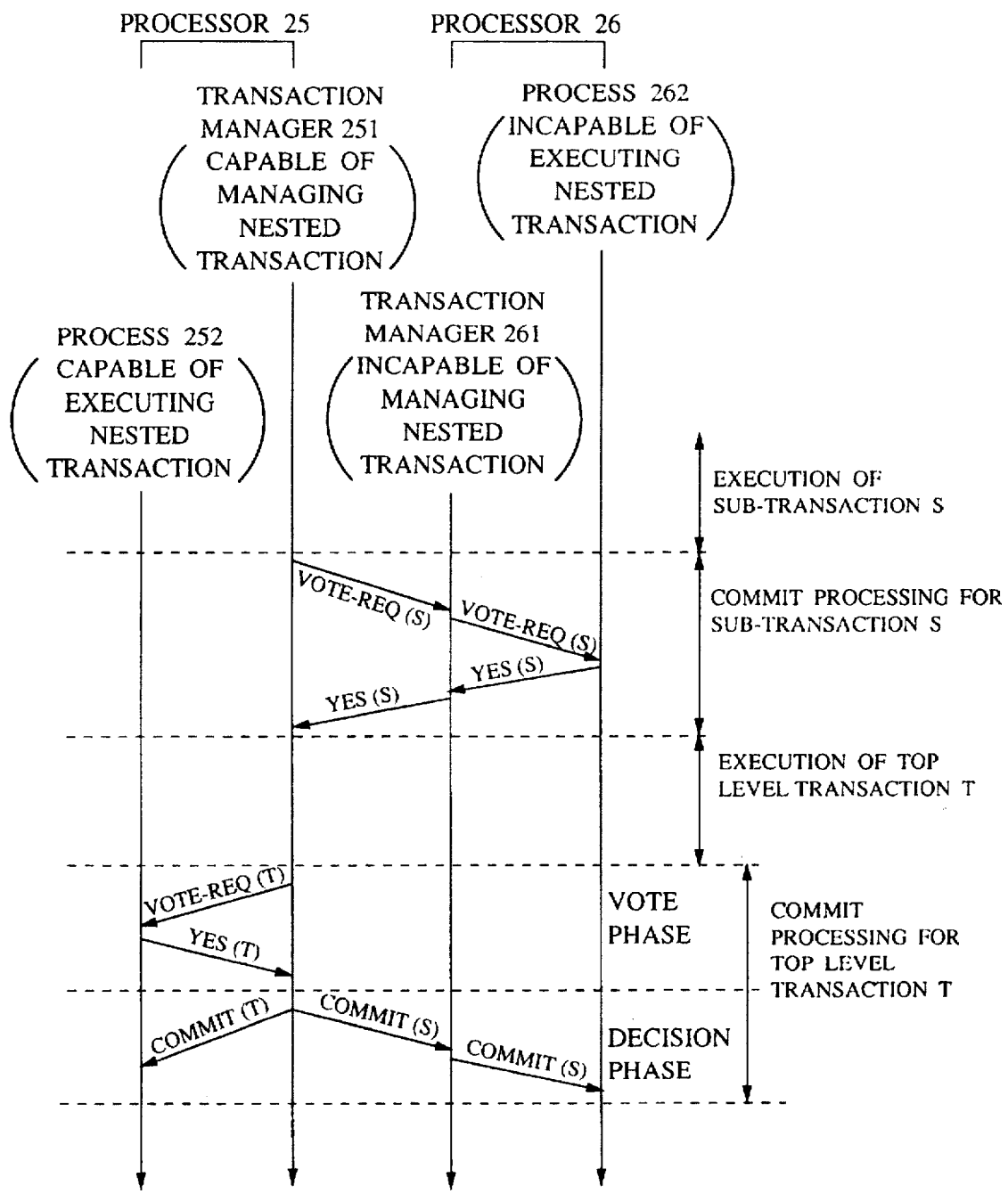
FIG. 44 is a timing chart for an exemplary operation of the transaction processing on the processor of FIG. 40 in a sixth embodiment of a transaction processing system according to the present invention, in a case of commitment.
Figure 45:
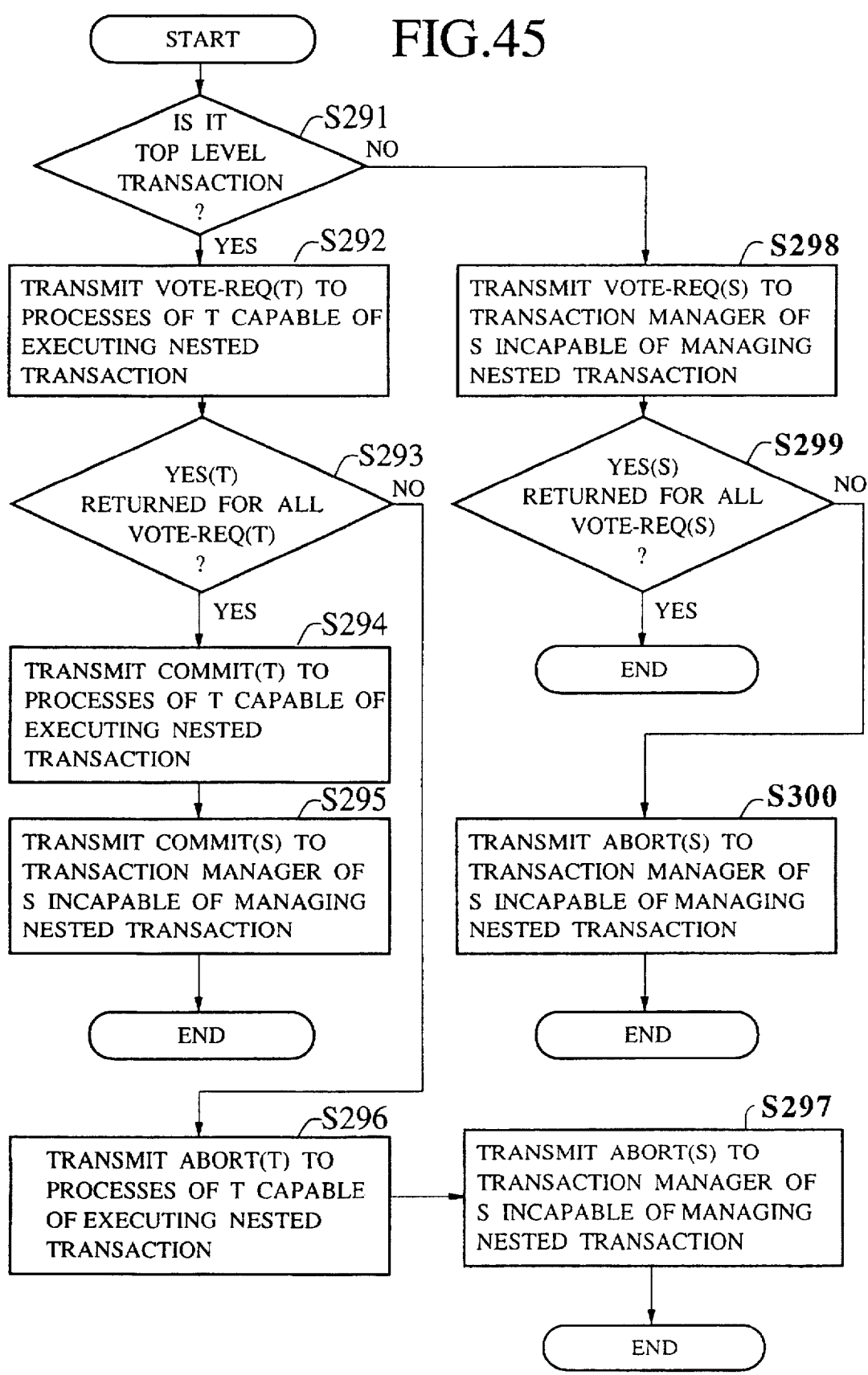
FIG. 45 is a flow chart of an operation for a commit processing in a transaction manager on the processor of FIG. 40 in a sixth embodiment of a transaction processing system according to the present invention.

Referring now to FIGS. 44 and 45, a sixth embodiment of a transaction processing system according to the present invention, which can be utilized in the distributed processing system of the present invention described above, will be described in detail.

This sixth embodiment also concerns with a case similar to that of the fifth embodiment described above, in which the nested transaction formed by a top level transaction T and its sub-transaction S is to be managed on the configuration shown in FIG. 40, in which the transaction manager 251 capable of managing the nested transaction has the process table 2511, the transaction table 2512, and the node table 2513 as shown in FIG. 41A, while the transaction manager 261 incapable of managing the nested transaction only has the transaction table 2612.

Here, however, in this sixth embodiment, the transaction manager 251 carries out the commit processing according to the timing chart of FIG. 44 as follows.

Namely, when the execution of the sub-transaction S is completed, the transaction manager 251 carries out the vote phase of the commit processing for the processes of the sub-transaction S which are incapable of executing the nested transaction through the transaction manager 261, concurrently with the commit processing for the processes of the sub-transaction S which are capable of executing the nested transaction, while not carrying out the decision phase of the commit processing for the processes of the sub-transaction S which are incapable of executing the nested transaction.

Then, after the execution of the top level transaction T is completed, the transaction manager 251 carries out the commit processing for the top level transaction T, where the decision phase of the commit processing for the processes of the sub-transaction S which are incapable of executing the nested transaction is also carried out through the transaction manager 261, concurrently with the decision phase of the commit processing for the top level transaction T, according to the flow chart of FIG. 45.

First, at the step S291, whether it is the top level transaction or not is determined.

Then, in a case it is the top level transaction, i.e., a case of the commit processing for the top level transaction T, next at the step S292, a vote request VOTE-REQ(T) for the top level transaction T is transmitted to all the processes which are related to the top level transaction T and capable of executing the nested transaction, which in this case include the process-1 252.

Then, next at the step S293, whether the replies YES(T) are received from all the processes to which the vote requests VOTE-REQ(T) have been transmitted or not is determined.

When the replies YES(T) are received from all the processes to which the vote requests VOTE-REQ(T) have been transmitted, as shown in the timing chart of FIG. 44, the vote phase is finished and the commit processing proceeds to the following decision phase next.

Namely, in this case, in the decision phase, first at the step S294, a commit request COMMIT(T) for the top level transaction T is transmitted to all the processes which are related to the top level transaction T and capable of executing the nested transaction, which in this case include the process-1 252.

Then, next at the step S295, a commit request COMMIT (S) for the processes of the sub-transaction S which are incapable of executing the nested transaction is transmitted to all the transaction managers of the sub-transaction S which are related to any one of the sub-transaction S of the top level transaction T and incapable of managing the nested transaction, which in this case include the transaction manager 261, and the process is terminated.

On the other hand, when at least one reply NO(T) is received from any one of the processes to which the vote requests VOTE-REQ(T) have been transmitted, the vote phase is finished and the commit processing proceeds to the following decision phase next.

Namely, in this case, in the decision phase, at the step S296, an abort request ABORT(T) for the top level transaction T is transmitted to all the processes which are related to the top level transaction T and capable of executing the nested transaction, which in this case include the process-1 122.

Then, next at the step S297, an abort request ABORT(S) for the processes of the sub-transaction S which are incapable of executing the nested transaction is transmitted to all the transaction managers of the sub-transaction S which are related to any one of the sub-transaction S of the top level transaction T and incapable of managing the nested transaction, which in this case include the transaction manager 261, and the process is terminated.

Meanwhile, when it is not the top level transaction at the step S291, i.e., a case of the commit processing for the processes of the sub-transaction S which are incapable of executing the nested transaction, next at the step S298, a vote request VOTE-REQ(S) for the processes of the sub-transaction S which are incapable of executing the nested transaction is transmitted to all the transaction managers of the sub-transaction S which are related to any one of the sub-transaction S of the top level transaction T and incapable of managing the nested transaction, which in this case include the transaction manager 261.

Then, next at the step S299, whether the replies YES(S) are received from all the transaction managers to which the vote requests VOTE-REQ(S) have been transmitted or not is determined.

When the replies YES(S) are received from all the transaction managers to which the vote requests VOTE-REQ(S) have been transmitted, as shown in the timing chart of FIG. 44, the process is terminated.

On the other hand, when at least one reply NO(S) is received from any one of the transaction managers to which the vote requests VOTE-REQ(S) have been transmitted, the vote phase is finished and the commit processing proceeds to the following decision phase next.

Namely, in this case, in the decision phase, at the step S300, an abort request ABORT(S) for the processes of the sub-transaction S which are incapable of executing the nested transaction is transmitted to all the transaction managers of the sub-transaction S which are related to any sub-transaction S of the top level transaction T and incapable of managing the nested transaction, which in this case include the transaction manager 261, and the process is terminated.

In this manner, the commit processing for the entire transaction family can be completed.

It is to be noted that this commit processing procedure of the sixth embodiment is equally valid as that of the fifth embodiment described above, because it suffices for the vote phase of the commit processing for the process of the sub-transaction S which are incapable of executing the nested transaction to be completed any time before the decision phase of the commit processing for the top level transaction T starts.

Figure 46:
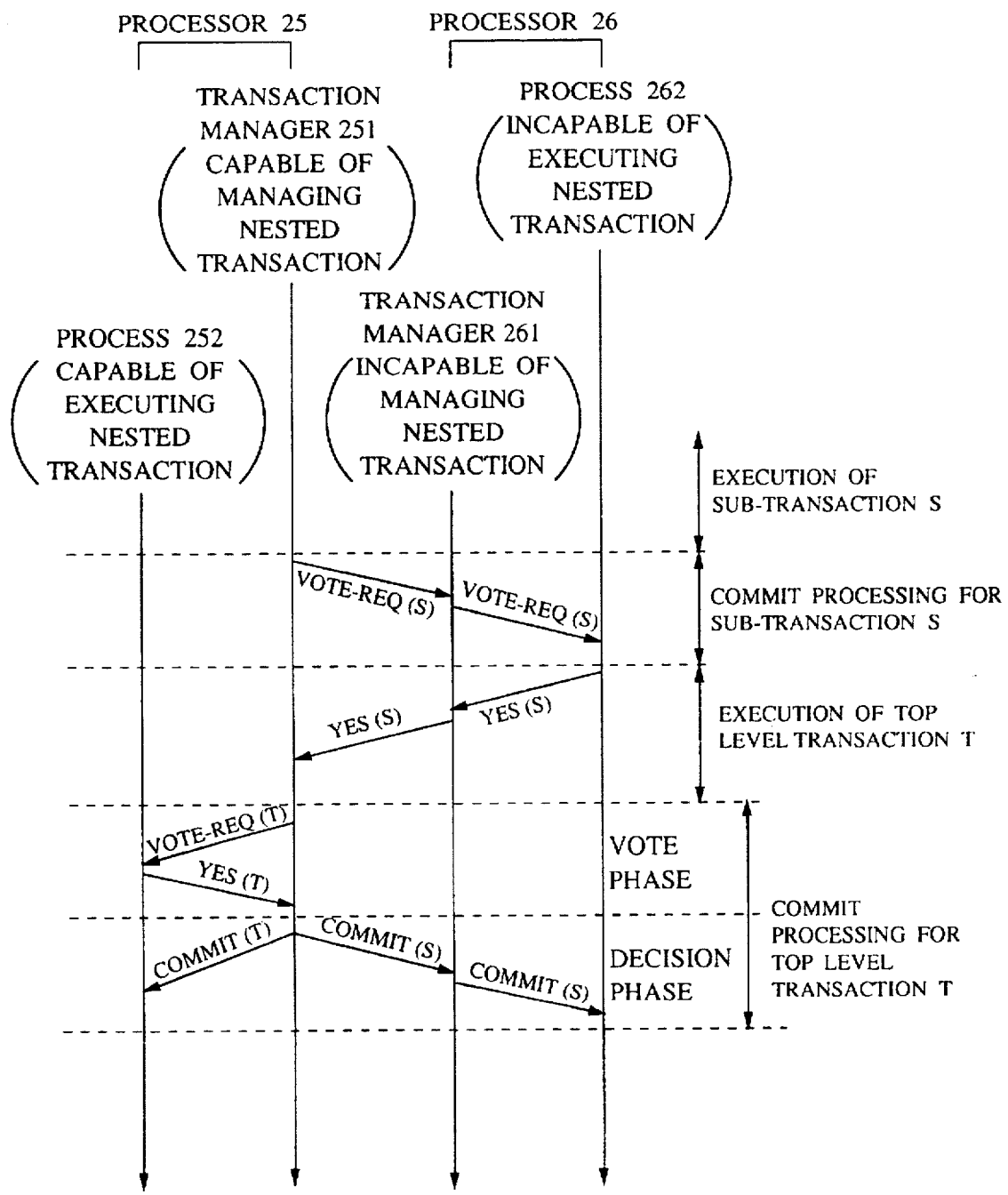
FIG. 46 is a timing chart for an exemplary operation of the transaction processing on the processor of FIG. 40 in a seventh embodiment of a transaction processing system according to the present invention, in a case of commitment.
Figure 47:
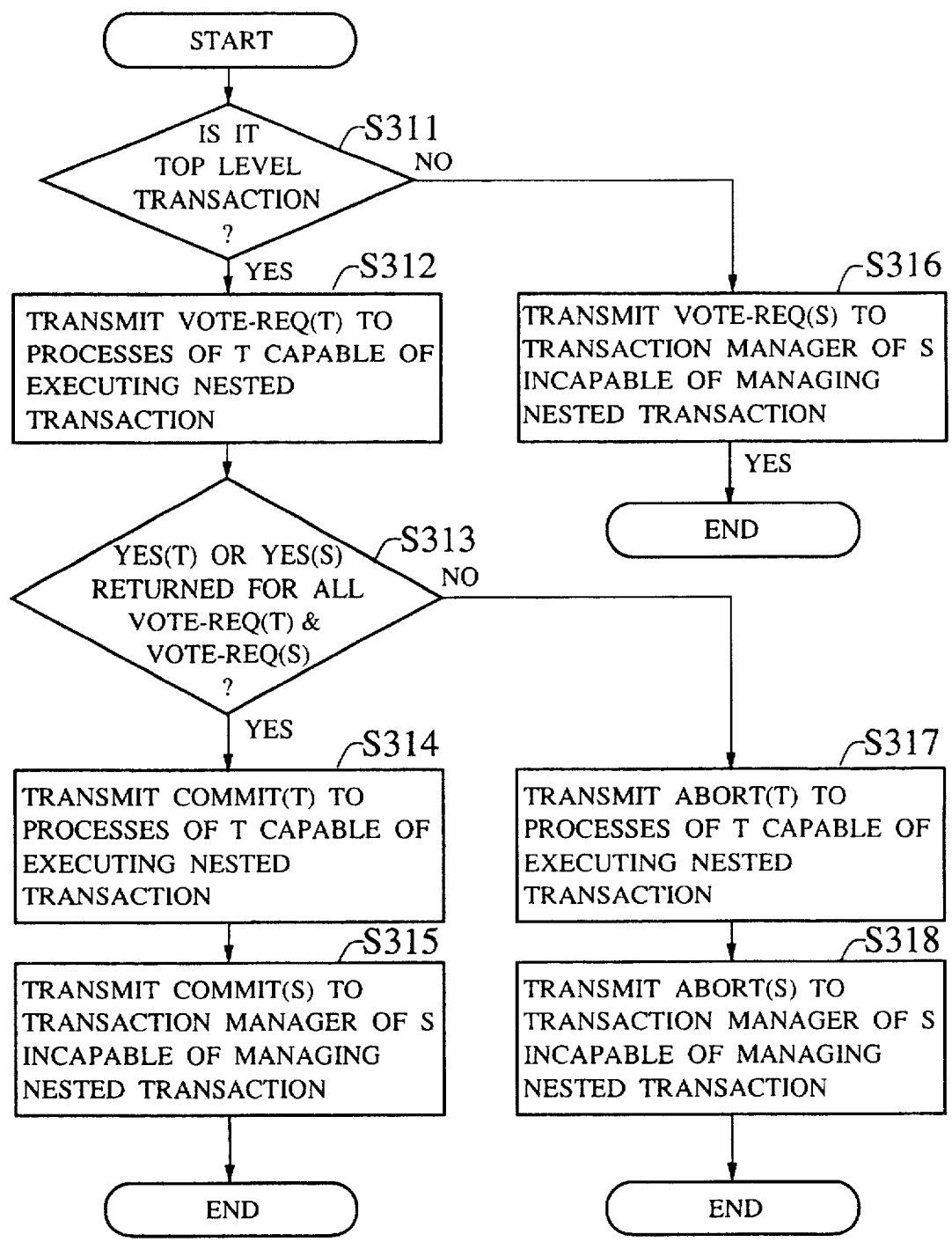
FIG. 47 is a flow chart of an operation for a commit processing in a transaction manager on the processor of FIG. 40 in a seventh embodiment of a transaction processing system according to the present invention.

Referring now to FIGS. 46 and 47, a seventh embodiment of a transaction processing system according to the present invention, which can be utilized in the distributed processing system of the present invention described above, will be described in detail.

This seventh embodiment also concerns with a case similar to that of the fifth embodiment described above, in which the nested transaction formed by a top level transaction T and its sub-transaction S is to be managed on the configuration shown in FIG. 40, in which the transaction manager 251 capable of managing the nested transaction has the process table 2511, the transaction table 2512, and the node table 2513 as shown in FIG. 41A, while the transaction manager 261 incapable of managing the nested transaction only has the transaction table 2612.

Here, however, in this seventh embodiment, the transaction manager 251 carries out the commit processing, according to the timing chart of FIG. 46 as follows.

Namely, when the execution of the sub-transaction S is completed, the transaction manager 251 carries out the commit processing for the processes of the sub-transaction S which are capable of executing the nested transaction. At the same time, the transaction manager 251 transmits the vote request VOTE-REQ(S) to the transaction manager 261 incapable of executing the nested transaction. In other words, a first part of the vote phase of the commit processing for the processes of the sub-transaction S which are incapable of executing the nested transaction is carried out concurrently with the commit processing for the processes of the sub-transaction S which are capable of executing the nested transaction.

Then, during the execution of the top level transaction T, the reply for the VOTE-REQ(S) is returned from the processes of the sub-transaction S which are incapable of executing the nested transaction to the transaction manager 251 through the transaction manager 261.

Then, after the execution of the top level transaction T is completed, the transaction manager 251 carries out the commit processing for the top level transaction T, where the decision phase of the commit processing for the processes of the sub-transaction S which are incapable of executing the nested transaction is carried out concurrently with the decision phase of the commit processing for the top level transaction T, according to the flow chart of FIG. 47.

First, at the step S311, whether it is the top level transaction or not is determined.

Then, in a case it is the top level transaction, i.e., a case of the commit processing for the top level transaction T, next at the step S312, a vote request VOTE-REQ(T) for the top level transaction T is transmitted to all the processes which are related to the top level transaction T and capable of executing the nested transaction, which in this case include the process-1 252.

Then, next at the step S313, whether the replies YES(T) or YES(S) are received for all of the transmitted vote requests VOTE-REQ(T) and VOTE-REQ(S) or not is determined.

When the replies YES(T) or YES(S) are received for all of the transmitted vote requests VOTE-REQ(T) and VOTE-REQ(S), as shown in the timing chart of FIG. 46, the vote phase is finished and the commit processing proceeds to the following decision phase next.

Namely, in this case, in the decision phase, first at the step S314, a commit request COMMIT(T) for the top level transaction T is transmitted to all the processes which are related to the top level transaction T and capable of executing the nested transaction, which in this case include the process-1 252.

Then, next at the step S315, a commit request COMMIT (S) for the processes of the sub-transaction S which are incapable of executing the nested transaction is transmitted to all the transaction managers of the sub-transaction S which are related to any one of the sub-transaction S of the top level transaction T and incapable of executing the nested transaction, which in this case include the transaction manager 261, and the process is terminated.

On the other hand, when at least one reply NO(T) or NO(S) is received for any one of the transmitted vote requests VOTE-REQ(T) and VOTE-REQ(S), the vote phase is finished and the commit processing proceeds to the following decision phase next.

Namely, in this case, in the decision phase, first at the step S317, an abort request ABORT(T) for the top level transaction T is transmitted to all the processes which are related to the top level transaction T and capable of executing the nested transaction, which in this case include the process-1 252.

Then, next at the step S318, an abort request ABORT(S) for the processes of the sub-transaction S which are incapable of executing the nested transaction is transmitted to all the transaction managers of the sub-transaction S which are related to any sub-transaction S of the top level transaction T and incapable of executing the nested transaction, which in this case include the transaction manager 261, and the process is terminated.

Meanwhile, when it is not the top level transaction at the step S311, i.e., a case of the commit processing for the processes of the sub-transaction S which are incapable of executing the nested transaction, next at the step S316, a vote request VOTE-REQ(S) for the processes of the sub-transaction S which are incapable of executing the nested transaction is transmitted to all the transaction managers of the sub-transaction S which are related to any one of the sub-transaction S of the top level transaction T and incapable of executing the nested transaction, which in this case include the transaction manager 261, and the process is terminated.

In this manner, the commit processing for the entire transaction family can be completed.

It is to be noted that this commit processing procedure of the seventh embodiment is equally valid as that of the fifth embodiment described above, because it suffices for the vote phase of the commit processing for the process of the sub-transaction S which are incapable of executing the nested transaction to be completed any time before the decision phase of the commit processing for the top level transaction T starts.

Figure 48:
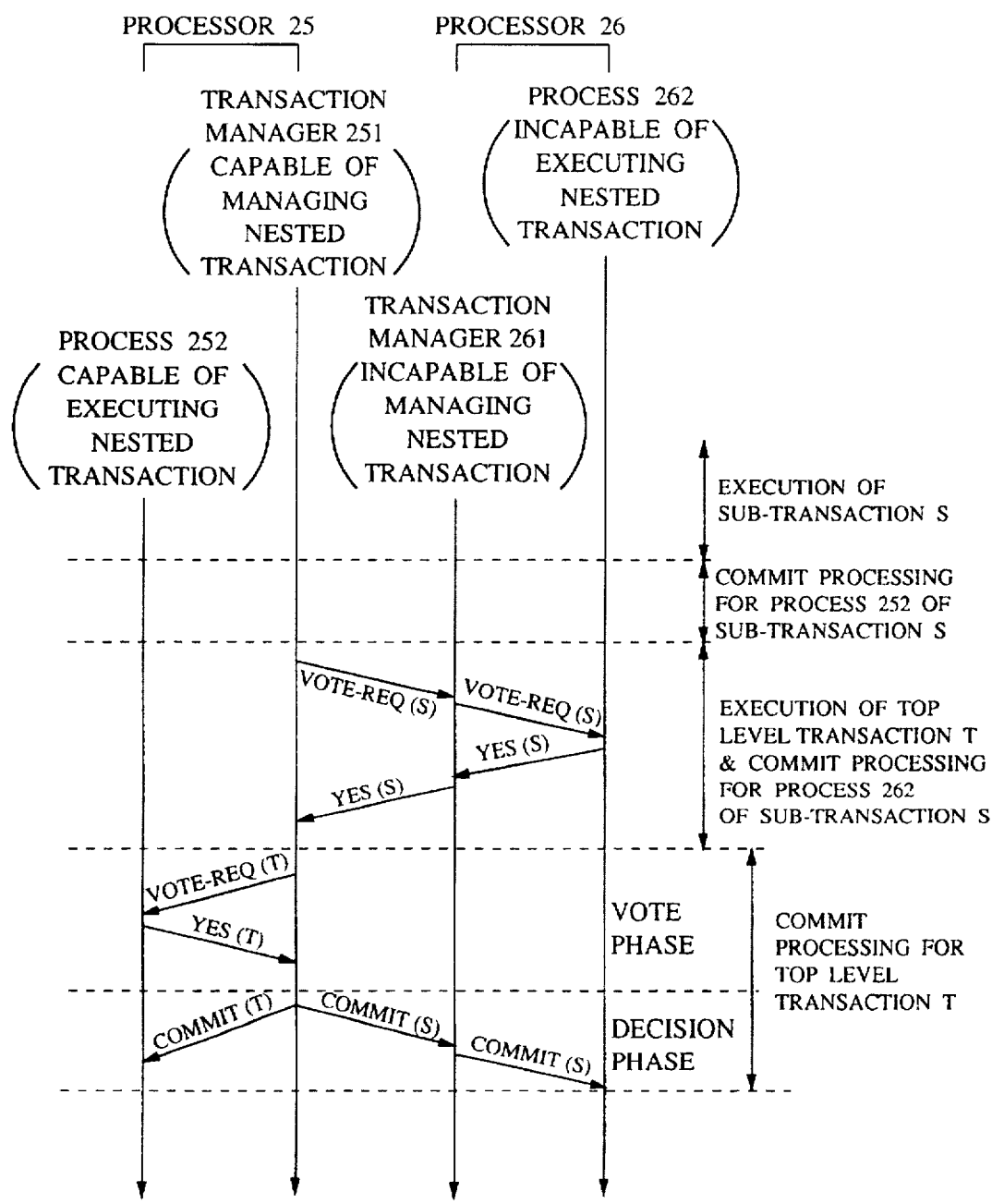
FIG. 48 is a timing chart for an exemplary operation of the transaction processing on the processor of FIG. 40 in an eighth embodiment of a transaction processing system according to the present invention, in a case of commitment.

Referring now to FIG. 48, an eighth embodiment of a transaction processing system according to the present invention, which can be utilized in the distributed processing system of the present invention described above, will be described in detail.

This eighth embodiment also concerns with a case similar to that of the fifth embodiment described above, in which the nested transaction formed by a top level transaction T and its sub-transaction S is to be managed on the configuration shown in FIG. 40, in which the transaction manager 251 capable of managing the nested transaction has the process table 2511, the transaction table 2512, and the node table 2513 as shown in FIG. 41A, while the transaction manager 261 incapable of managing the nested transaction only has the transaction table 2612.

Here, however, in this eighth embodiment, the transaction manager 251 carries out the commit processing, according to the timing chart of FIG. 48 as follows.

Namely, when the execution of the sub-transaction S is completed, the transaction manager 251 carries out the commit processing for the processes of the sub-transaction S which are capable of executing the nested transaction, while not carrying out the commit processing for the processes of the sub-transaction S which are incapable of executing the nested transaction.

Then, during the execution of the top level transaction T, the transaction manager 251 carries out the vote phase of the commit processing for the processes of the sub-transaction S which are incapable of executing the nested transaction, through the transaction manager 261.

Then, after the execution of the top level transaction T is completed, the transaction manager 251 carries out the commit processing for the top level transaction T, where the decision phase of the commit processing for the processes of the sub-transaction S which are incapable of executing the nested transaction is also carried out through the transaction manager 261, concurrently with the decision phase of the commit processing for the top level transaction T, just as in the seventh embodiment described above.

It is to be noted that this commit processing procedure of the eighth embodiment is equally valid as that of the fifth embodiment described above, because it suffices for the vote phase of the commit processing for the processes of the sub-transaction S which are incapable of executing the nested transaction to be completed any time before the decision phase of the commit processing for the top level transaction T starts.

As described, according to the fifth to the eighth embodiments described above, it becomes possible to provide a transaction processing system suitable for dealing with a nested transaction, which is compatible with already existing transaction manager and process incapable of dealing with a nested transaction.

Here, it is to be noted that the transaction processing system according to the present invention as described above may be utilized on its own right, independently from the distributed processing system of the present invention described above.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of distributed processing among processors having a plurality of server processes for providing services and a service manager for managing the services provided by the server processes, the method comprising the steps of:
    registering each of the services provided by said plurality of server processes of the processors to the service manager in correspondence with an executability condition for determining whether the respective server process is capable of executing a particular service;
    transmitting an inquiry concerning a desired service to be received by a client process to the service manager on one of the processors;
    selecting one of the server processes which is providing the desired service indicated by the inquiry transmitted at the transmitting step and which is determined to be a server process which is capable of being used to execute the desired service according to the executability condition registered at the service manager on said one of the processors; and
    requesting the desired service from the client process to said one of the server processes selected at the selecting step.

2. The method of claim 1, wherein the executability condition is given in a form of an executability judgement procedure for judging the executability of each service.

3. The method of claim 2, wherein the executability judgement procedures for the services provided by said plurality server processes are stored in memory means, and the executability condition for each server process is registered at the registering step by reading an appropriate one of the executability judgement procedures stored in the memory means according to an address in the memory means specified by said each server process.

4. The method of claim 1, wherein the executability condition is defined in terms of arguments of each service for specifying details of said each service.

5. The method of claim 1, wherein each processor also has a communication processing means for communicating with the communication processing means of an other processor, such that the desired service is requested from the client process to the server process at the requesting step through the communication processing means of a processor on which the client process is located.

6. The method of claim 1, wherein each processor also has a communication processing means for communicating with the communication processing means of an other processor, such that the inquiry is transmitted from the client process to the service manager at the transmitting step through the communication processing means of a processor on which the client process is located.

7. The method of claim 1, wherein each processor also has a communication processing means for communicating with the communication processing means of an other processor, such that the inquiry is transmitted from the communication processing means of a processor on which the client process is located to the service manager at the transmitting step and the desired service is requested from the communication processing means of a processor on which the client process is located to the service process at the requesting step, in response to a request for receiving the desired service given from the client process to the communication processing means of a processor on which the client process is located.

8. The method of claim 1, wherein when there are more than one server processes providing the desired service and judged to be executable according to the executability condition registered in the service manager, said one of the server processes is selected at the selecting step according to a prescribed selection procedure.

9. The method of claim 8, wherein the prescribed selection procedure indicates a selection according to priority level assigned to each server process in advance.

10. The method of claim 8, wherein the prescribed selection procedure indicates a random selection.

11. The method of claim 8, wherein the prescribed selection procedure indicates a selection according to a predetermined order among the server processes.

12. The method of claim 8, wherein the prescribed selection procedure indicates a selection according to priority level assigned to each server process which is higher for the server processes which has not been selected at the selecting step for a longer period of time.

13. The method of claim 8, wherein the prescribed selection procedure indicates a selection according to priority level assigned to each server process which is higher for the server processes which exert smaller load to the respective processor.

14. The method of claim 8, wherein the prescribed selection procedure indicates a selection according to weights assigned to each server process in accordance with the load exerted by each of the server processes to the respective processor.

15. The method of claim 1, wherein the client process memorizes said one of the server processes selected at the selecting step in response to the inquiry transmitted at the transmitting step, such that in a case of requesting a previously requested desired service again, the transmitting step and the selecting step are omitted.

16. The method of claim 1, wherein the client process is located on said one of the processors to which the inquiry is transmitted at the transmitting step.

17. The method of claim 1, wherein the client process is located on an additional processor without the service manager which is different from said one of the processors to which the inquiry is transmitted at the transmitting step.

18. The method of claim 1, wherein each processor has a database associated with the service provided by the server process on said each processor and the executability condition for each service indicates available data in the database associated with said each service.

19. The method of claim 1, wherein a plurality of the processors share a common database to be utilized in the services provided by the server processes on said plurality of the processors.

20. The method of claim 1, wherein the processors include a processor provided with a server process and no service manager.

21. A distributed processing system having a plurality of processors, comprising:
   a client process for requesting a desired service to be received, the client process being executed on one processor;
   a plurality of server processes for providing services; and
   a service manager for managing the services provided by the server processes by registering each of the services provided by said plurality of server processes of the processors to the service manager in correspondence with an executability condition for determining whether the respective server process is capable of executing a particular service the service manager receiving an inquiry concerning the desired service, and selecting one of the server processes which is providing the desired service indicated by the inquiry and which is determined to be a server process capable of executing the desired service according to the registered executability condition such that the desired service is requested to said one of the server processes selected by the service manager.

22. The system of claim 21, wherein the service manager registers the executability condition given in a form of an executability judgement procedure for judging the executability of each service.

23. The system of claim 22, further comprising memory means for storing the executability judgement procedures for the services provided by all server processes, and wherein the service manager registers the executability condition for each server process by reading an appropriate one of the executability judgement procedures stored in the memory means according to an address in the memory means specified by said each server process.

24. The system of claim 21, wherein the service manager registers the executability condition defined in terms of arguments of each service for specifying details of said each service.

25. The system of claim 21, wherein each processor also has a communication processing means for communicating with the communication processing means of other processor, such that when the server process providing the desired service is located on one processor different from another processor on which the client process is located, the client process requests the desired service to the server process through the communication processing means of said another processor on which the client process is located.

26. The system of claim 21, wherein each processor also has a communication processing means for communicating with the communication processing means of other processor, such that when said one of the processors on which the service manager is located is different from another processor on which the client process is located, the client process transmits the inquiry to the service manager through the communication processing means on said another processor on which the client process is located.

27. The system of claim 21, wherein each processor also has a communication processing means for communicating with the communication processing means of an other processor, such that the communication processing means of a processor on which the client process is located transmits the inquiry to the service manager and requests the desired service to said one of the server processes selected by the service manager, in response to a request for receiving the desired service given from the client process to the communication processing means of a processor on which the client process is located.

28. The system of claim 21, wherein when there are more than one server processes providing the desired service and judged to be executable according to the executability condition registered in the service manager, the service manager selects said one of the server processes according to a prescribed selection procedure.

29. The system of claim 28, wherein the prescribed selection procedure indicates a selection according to priority level assigned to each server process in advance.

30. The system of claim 28, wherein the prescribed selection procedure indicates a random selection.

31. The system of claim 28, wherein the prescribed selection procedure indicates a selection according to a predetermined order among the server processes.

32. The system of claim 28, wherein the prescribed selection procedure indicates a selection according to priority level assigned to each server process which is higher for the server processes which has not been selected at the selecting step for a longer period of time.

33. The system of claim 28, wherein the prescribed selection procedure indicates a selection according to priority level assigned to each server process which is higher for the server processes which exert smaller load to the respective processor.

34. The system of claim 28, wherein the prescribed selection procedure indicates a selection according to weights assigned to each server process in accordance with the load exerted by each of the server processes to the respective processor.

35. The system of claim 21, wherein the client process memorizes said one of the server processes selected by the service manager in response to the inquiry, such that in a case of requesting a previously requested desired service again, the transmitting of the inquiry to the service manager and the selecting of said one of the server processes by the service manager in response to the inquiry are omitted.

36. The system of claim 21, wherein the client process is located on said one of the processors to which the inquiry is transmitted.

37. The system of claim 21, wherein the client process is located on an additional processor without the service manager which is different from said one of the processors to which the inquiry is transmitted.

38. The system of claim 21, wherein each processor also has a database associated with the service provided by the server process on said each processor and the executability condition for each service indicates available data in the database associated with said each service.

39. The system of claim 21, further comprising a common database shared by said plurality of processors and to be utilized in the services provided by the server processes on said plurality of the processors.

40. The system of claim 21, wherein the processors include a processor provided with a server process and no service manager.

41. A method of managing transaction processing in a transaction processing system including first processes capable of executing nested transactions, second processes incapable of executing nested transactions and a transaction manager capable of managing nested transactions, comprising the steps of:

(a) executing sub-transactions of one nested transaction by means of respective of said first and second processes;

(b) carrying out a commit processing only for the first processes which executed sub-transactions in step (a);

(c) executing a top level transaction of said one nested transaction after step (b);

(d) carrying out a commit processing for the top level transaction after step (c); and (e) completing a commit processing for the second processes which executed sub-transactions in step (a), concurrently with a completion of the commit processing for the top level transaction carried out in step (d).

42. The method of claim 41, wherein the commit processing for the second processes is entirely carried out concurrently with the commit processing for the top level transaction at the step (d).

43. The method of claim 41, wherein a vote phase of the commit processing for the second processes is carried out concurrently with the commit processing for the first processes at the step (b), while a decision phase of the commit processing for the second processes is carried out concurrently with a decision phase of the commit processing for the top level transaction at the step (d).

44. The method of claim 41, wherein a vote phase of the commit processing for the second processes is carried out concurrently with the commit processing for the first processes at the step (b) and an execution of the top level transaction at the step (c), while a decision phase of the commit processing for the second processes is carried out concurrently with a decision phase of the commit processing for the top level transaction at the step (d).

45. The method of claim 41, wherein a vote phase of the commit processing for the second processes is carried out concurrently with an execution of the top level transaction at the step (c), while a decision phase of the commit processing for the second processes is carried out concurrently with a decision phase of the commit processing for the top level transaction at the step (d).

46. The method of claim 41, wherein the transaction processing system has: one processor on which the first processes and the transaction manager capable of managing nested transactions are provided; another processor on which the second processes and another transaction manager capable of managing nested transaction are provided; and a communication connection means for enabling a communication between the transaction manager on said one processor and said another transaction manager on said another processor, such that the commit processing for the second processes is carried out by the transaction manager on said one processor by communication with said another transaction manager on said another processor through the communication connection means.

47. The method of claim 46, wherein said another transaction manager on said another processor carries out a decision phase of the commit processing with respect to the second processes in response to a notification of a commitment of the top level transaction from the transaction manager on said one processor communicated to said another transaction manager on said another processor through the communication connection means.

48. The method of claim 41, wherein the transaction processing system has: one processor on which the first processes and the transaction manager capable of managing nested transactions are provided; another processor on which the second processes and another transaction manager incapable of managing nested transaction are provided; and a communication connection means for enabling a communication between the transaction manager on said one processor and said another transaction manager on said another processor, such that the commit processing for the second processes is carried out by the transaction manager on said one processor by communication with said another transaction manager on said another processor through the communication connection means.

49. The method of claim 48, wherein said another transaction manager of said another processor carries out a decision phase of the commit processing with respect to the second processes in response to a notification of a commitment of the sub-transactions from the transaction manager on said one processor communicated to said another transaction manager on said another processor through the communication connection means.

50. The method of claim 41, wherein the transaction processing system has: one processor on which the first processes and the transaction manager capable of managing nested transactions are provided; another processor on which the second processes and another transaction manager are provided; and a communication connection means for enabling a communication between the transaction manager on said one processor and said another transaction manager on said another processor, such that a vote phase of the commit processing for the second processes is carried out by the transaction manager on said one processor by transmitting a vote request to said another transaction manager on said another processor through the communication connection means.

* * * * *